United States Patent
Sasaki et al.

(10) Patent No.: US 8,136,373 B2
(45) Date of Patent: Mar. 20, 2012

(54) CONDUIT STRUCTURE FOR MOLTEN GLASS AND VACUUM DEGASSING APPARATUS USING THE CONDUIT STRUCTURE

(75) Inventors: Michito Sasaki, Tokyo (JP); Motoichi Iga, Tokyo (JP); Hajime Itoh, Tokyo (JP); Kazuhiko Yamada, Tokyo (JP); Masahiro Saitou, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 404 days.

(21) Appl. No.: 12/393,347

(22) Filed: Feb. 26, 2009

(65) Prior Publication Data
US 2009/0165501 A1 Jul. 2, 2009

Related U.S. Application Data

(63) Continuation of application No. PCT/JP2007/066690, filed on Aug. 28, 2007.

(30) Foreign Application Priority Data

Aug. 29, 2006 (JP) ................................. 2006-231831

(51) Int. Cl.
*C03B 5/20* (2006.01)
(52) U.S. Cl. ...................................... 65/135.1; 65/134.1
(58) Field of Classification Search .................. 65/134.1, 65/134.9, 135.1
See application file for complete search history.

(56) References Cited

U.S. PATENT DOCUMENTS 1,872,477 A * 8/1932 Mambourg ........................ 65/95
(Continued)

FOREIGN PATENT DOCUMENTS
EP 1 439 148 A2 7/2004
(Continued)

OTHER PUBLICATIONS

Extended European Search Report issued Apr. 13, 2011, in Application No. / Patent No. 07806167.8-1218 / 2060545 PCT/JP2007066690.

*Primary Examiner* — Jason L Lazorcik
*Assistant Examiner* — Jodi C Franklin
(74) *Attorney, Agent, or Firm* — Oblon, Spivak, McClelland, Maier & Neustadt, L.L.P.

(57) ABSTRACT

A conduit structure for molten glass, a conduit system for molten glass, a vacuum degassing apparatus and a method for vacuum-degassing molten glass by use of the vacuum degassing apparatus, which are capable of effectively removing components eluted from a refractory brick forming a conduit for molten glass, foreign substances generated in the interface between molten glass and a platinum wall surface forming a conduit for molten glass, a bubble remaining in a surface layer of molten glass, a glass material denatured by volatilization, and the like, are provided.

A conduit structure for molten glass, which is formed of a hollow pipe made of platinum or a platinum alloy, includes a double-pipe structure disposed in at least a downstream portion of the conduit structure, the double-pipe structure being formed of an inner pipe and an outer pipe; the inner pipe having an upstream end and a downstream end formed as open ends; the outer pipe having a downstream end formed as a closed end in a region located in a gap between the inner pipe and the outer pipe and as an open end in a region located in the inner pipe in the double-pipe structure; the conduit structure having an upstream end formed as an open end; and the outer pipe having an opening formed in a portion close to the downstream end thereof.

22 Claims, 10 Drawing Sheets

U.S. PATENT DOCUMENTS

| | | | |
|---|---|---|---|
| 4,504,302 A * | 3/1985 | Carman | 65/134.9 |
| 6,294,005 B1 * | 9/2001 | Inoue et al. | 96/193 |
| 6,405,564 B1 * | 6/2002 | Takei et al. | 65/157 |
| 6,536,238 B2 * | 3/2003 | Kawaguchi et al. | 65/134.9 |
| 2001/0037661 A1 * | 11/2001 | Takei et al. | 65/134.2 |
| 2003/0015000 A1 | 1/2003 | Hayes et al. | |
| 2003/0037572 A1 * | 2/2003 | Dick et al. | 65/134.9 |
| 2003/0051509 A1 * | 3/2003 | Sakai et al. | 65/157 |
| 2003/0066315 A1 * | 4/2003 | Sakai et al. | 65/157 |
| 2005/0268663 A1 * | 12/2005 | Tomita et al. | 65/374.12 |

FOREIGN PATENT DOCUMENTS

| | | |
|---|---|---|
| EP | 1 439 148 A3 | 7/2004 |
| JP | 62-297221 | 12/1987 |
| JP | 2-221129 | 9/1990 |
| JP | 11-139834 | 5/1999 |
| JP | 11-171554 | 6/1999 |
| JP | 11-240726 | 9/1999 |
| JP | 2000-7345 | 1/2000 |
| JP | 2003-89529 | 3/2003 |
| JP | 2006-306662 | 11/2006 |

* cited by examiner

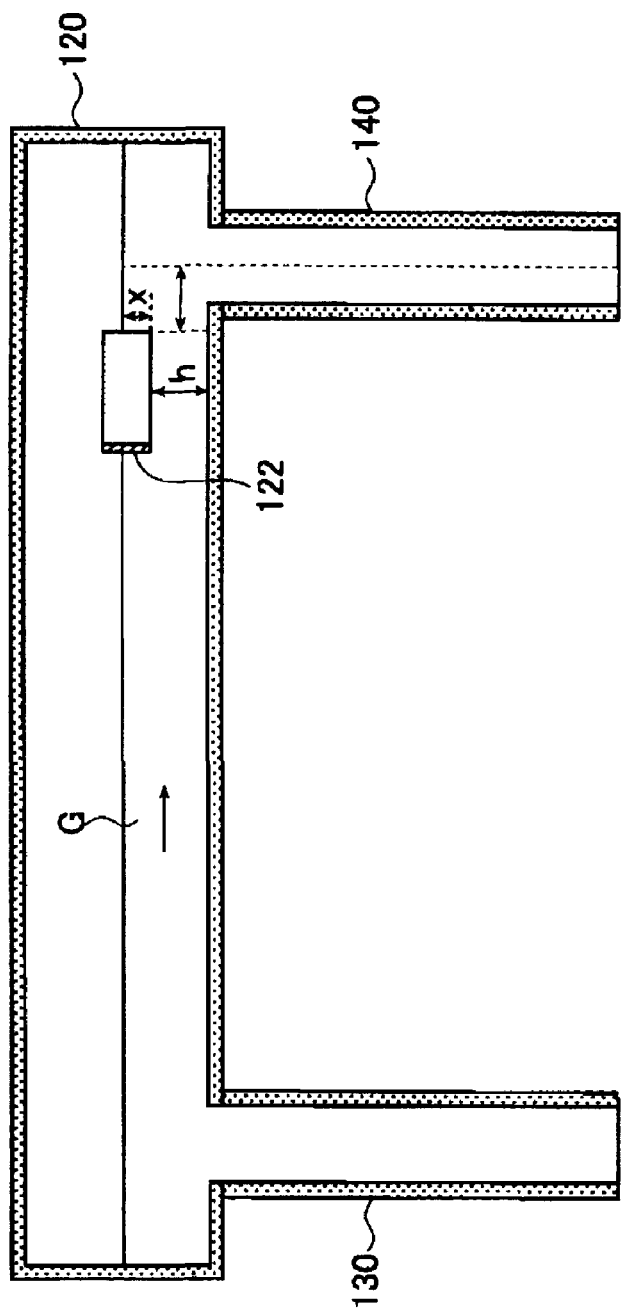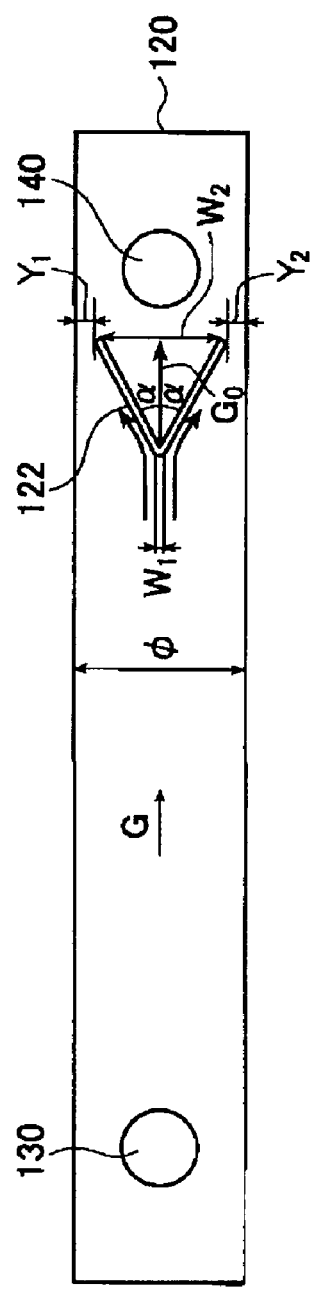
Fig. 14(a)
Fig. 14(b)

CONDUIT STRUCTURE FOR MOLTEN GLASS AND VACUUM DEGASSING APPARATUS USING THE CONDUIT STRUCTURE

TECHNICAL FIELD

The present invention relates to a conduit structure for molten glass. The conduit structure for molten glass according to the present invention may be used as a downfalling pipe of a vacuum degassing apparatus or an extending pipe connected to the downfalling pipe.

The present invention also relates to a conduit system including the conduit structure and a drain-out.

The present invention also relates to a vacuum degassing apparatus and a method for vacuum-degassing molten glass by use of the vacuum degassing apparatus.

BACKGROUND ART

In a glass-producing apparatus, such as a vacuum degassing apparatus, the materials used for forming a vacuum degassing vessel serving as a channel for molten glass, and conduits for molten glass formed of a hollow tube, such as an uprising pipe and a downfalling pipe, are required to be excellent in heat resistance and corrosion resistance to molten glass. Although platinum or a platinum alloy, such as a platinum-rhodium alloy, is utilized as the materials satisfying such requirements in some cases (see Patent Document 1), refractory bricks, such as fused cast refractories, have been widely utilized because of being inexpensive in comparison with platinum (see Patent Document 2).

However, when refractory bricks, such as fused cast refractories, are utilized to form a conduit for molten glass, it is likely that components contained in the refractory bricks are eluted and mixed into the molten glass. Examples of the components include zirconia eluted from ziroconia-based fused cast refractories, and alumina eluted from alumina-silica-based fused cast refractories or ziroconia-based fused cast refractories.

If such components are uniformly dispersed in molten glass, it is unlikely that produced glass is adversely affected. However, unless such components are uniformly dispersed in molten glass, it is likely that produced glass has defects, such as reams.

On the other hand, when a conduit for molten glass is made of platinum or a platinum alloy, foreign substances are caused from such platinum or a platinum alloy in the interface between a platinum wall surface and molten glass in some cases. Foreign substances, which have been caused from such platinum or a platinum alloy and stay in molten glass, cause produced glass to have defects.

When a conduit for molten glass is made of refractory bricks, platinum or a platinum alloy, bubbles are formed in the interface between a conduit wall surface and molten glass in some cases. If bubbles are formed in the interface between a conduit wall surface and molten glass in the vacuum degassing vessel or a downfalling pipe (a conduit for molten glass downstream the vacuum degassing apparatus) of a vacuum degassing apparatus, the produced glass is caused to have defects since it is difficult to remove the bubbles from the molten glass.

The conduit structure for molten glass includes a system for removing foreign substances mixed in molten glass, such as a drain-out or an overflow. However, these conventional foreign-substance removing systems have failed to sufficiently remove components eluted from a refractory brick forming a conduit for molten glass, foreign substances caused in the interface between molten glass and a platinum wall surface forming a conduit for the molten glass, and bubbles formed in the interface between a conduit wall surface and the molten glass (hereinbelow, collectively referred to as "foreign substances etc. generated in the interface between molten glass and a platinum wall surface forming a conduit for the molten glass" or "foreign substances etc.").

A flow of molten glass, which moves in a vacuum degassing vessel, contains unbroken bubbles or glass materials denatured by volatilization in some cases. If such substances are mixed in produced glass, it is necessary to remove such substances since the presence of such substances causes the produced glass to have defects. However, the conventional removing systems, such as a drain-out or an overflow has failed to sufficiently remove such unbroken bubbles or glass materials denatured by volatilization, which are contained in a flow of molten glass.

Patent Document 1: JP-A-2-221129
Patent Document 2: JP-A-11-139834

DISCLOSURE OF THE INVENTION

Problem that the Invention is to Solve

It is an object of the present invention to solve the above-mentioned problems in the prior art and to provide a conduit structure for molten glass, which is capable of effectively removing components eluted from a refractory brick and foreign substances etc. generated in the interface between molten glass and a platinum wall surface forming a conduit for the molten glass.

The conduit structure for molten glass according to the present invention is suitable for a downfalling pipe of a vacuum degassing apparatus or an extending pipe connected to the downfalling pipe.

It is another object of the present invention to provide a conduit system including the conduit structure and a drain-out.

It is another object of the present invention to provide a vacuum degassing apparatus wherein a downfalling pipe of a vacuum degassing apparatus or an extending pipe connected to the downfalling pipe is formed of the conduit system for molten glass according to the present invention, and a method for vacuum-degassing molten glass by use of the vacuum degassing apparatus.

It is another object of the present invention to provide a vacuum degassing apparatus, which is capable of effectively removing components eluted from a refractory brick forming a vacuum degassing vessel, an uprising pipe or a downfalling pipe, foreign substances generated in the interface between molten glass and a platinum wall surface forming the vacuum degassing vessel, the uprising pipe or the downfalling pipe, bubbles remaining in an outer layer of the molten glass, glass materials denatured by volatilization on the surface of the molten glass, and the like.

It is another object of the present invention to provide a method for vacuum-degassing molten glass by use of the vacuum degassing apparatus.

Means of Solving the Problems

In order to attain the above-mentioned objects, the inventors have been made tremendous research efforts on the flowage of molten glass, into which components eluted from a refractory brick, and foreign substances etc. generated in the interface between molten glass and a platinum wall surface forming a conduit for molten glass have mixed. Based on their research efforts, the inventors have found that such molten glass, into which components eluted from a refractory brick, and foreign substances etc. generated in the interface with a platinum wall surface are mixed, flows in a layer flow, staying in the vicinity of the inner wall of the conduit. Hereinbelow, this is referred to as a boundary layer flow in Description.

Specifically, such components eluted from a refractory brick, and such foreign substances etc. generated in the interface with a platinum wall surface flow as a boundary layer flow having a thickness of e.g. about 3 to 5 mm along the wall surface of the conduit without being uniformly dispersed in the molten glass.

Based on the above-mentioned finding, the present invention provides a conduit structure for molten glass, which is formed of a hollow pipe made of platinum or a platinum alloy, including:

a double-pipe structure disposed in at least a downstream portion of the conduit structure, the double-pipe structure being formed of an inner pipe and an outer pipe;

the inner pipe having an upstream end and a downstream end formed as open ends;

the outer pipe having a downstream end formed as a closed end in a region located in a gap between the inner pipe and the outer pipe and as an open end in a region located in the inner pipe in the double-pipe structure;

the conduit structure having an upstream end formed as an open end; and the outer pipe having an opening formed in a portion close to the downstream end thereof (hereinbelow, referred to as the conduit structure according to the present invention).

In the conduit structure according to the present invention, it is preferred that the inner pipe project from the closed end of the outer pipe in the downstream portion of the conduit structure.

In the conduit structure according to the present invention, it is preferred that a distance $L_{in}$ (mm) between the upstream end of the inner pipe and an upstream end of the opening, and an inner diameter $D_{in}$ (mm) of the inner pipe satisfy a relationship represented by the following formula:

$$L_{in} \geq D_{in}/2$$

In the conduit structure according to the present invention, it is preferred that a difference $D_{out-in}$ (mm) between an inner diameter of the outer pipe and an outer diameter of the inner pipe, and an inner diameter $D_{in}$ (mm) of the inner pipe satisfy a relationship represented by the following formula:

$$D_{out-in} \geq 0.02 \times D_{in}$$

In the conduit structure according to the present invention, it is preferred that a distance $L_{in}$ (mm) between the upstream end of the inner pipe and an upstream end of the opening, and a difference $D_{out-in}$ (mm) between an inner diameter of the outer pipe and an outer diameter of the inner pipe satisfy a relationship represented by the following formula:

$$L_{in} \geq (D_{out-in}/2) \times 3$$

In the conduit structure according to the present invention, it is preferred that a difference $S_{out-in}$ (mm$^2$) in section obtained by subtracting a sectional area of a channel formed by the inner pipe from a sectional area of a channel formed by the outer pipe, and a sectional area $S_{in}$ (mm$^2$) of the channel formed by the inner pipe satisfy the relationship represented by the following formula:

$$S_{out-in} \leq S_{in}$$

In the conduit structure according to the present invention, it is preferred that an area S (mm$^2$) of the opening and an inner diameter $D_{out}$ (mm) of the outer pipe satisfy the relationship represented by the following formula:

$$S \geq 9 \times D_{out}$$

The conduit structure according to the present invention is preferably utilized as a downfalling pipe of a vacuum degassing vessel including an uprising pipe, a vacuum degassing vessel and the downfalling pipe.

The conduit structure according to the present invention is preferably utilized as an extending pipe connected to a downfalling pipe of a vacuum degassing vessel including an uprising pipe, a vacuum degassing vessel and the downfalling pipe.

The present invention also provides a method for vacuum-degassing molten glass by use of an vacuum degassing apparatus including an uprising pipe, a vacuum degassing vessel and a downfalling pipe, including:

utilizing the conduit structure according to the present invention in the downfalling pipe.

The present invention also provides a method for vacuum-degassing molten glass by use of an vacuum degassing apparatus including an uprising pipe, a vacuum degassing vessel and a downfalling pipe, including:

utilizing the conduit structure according to the present invention in an extending pipe connected to the downfalling pipe.

The present invention also provides a conduit structure for molten glass, which is formed of a hollow pipe made of platinum or a platinum alloy, and a drain-out disposed in a downstream portion of the conduit structure and having at least one opening, including:

a double-pipe structure disposed in at least the downstream portion of the conduit structure, the double-pipe structure being formed of an inner pipe and an outer pipe;

the inner pipe having an upstream end and a downstream end formed as open ends;

the outer pipe having a downstream end formed as a closed end in a region located in a gap between the inner pipe and the outer pipe and as an open end in a region located in the inner pipe in the double-pipe structure;

the conduit structure having an upstream end formed as an open end; and the outer pipe having an opening formed in a portion close to the downstream end thereof, the opening formed in the outer pipe having an upstream end located so as to be away from an upstream end of the opening of the drain-out in a downstream direction by a distance of 0 to 500 mm.

The present invention also provides a vacuum degassing apparatus including an uprising pipe, a vacuum degassing vessel and a downfalling pipe, including:

utilizing the conduit structure according to the present invention in the downfalling pipe.

The present invention also provides a vacuum degassing apparatus including an uprising pipe, a vacuum degassing vessel and a downfalling pipe, including:

utilizing the conduit structure according to the present invention in an extending pipe connected to the downfalling pipe.

In Description, the above-mentioned vacuum degassing apparatus is referred to as the vacuum degassing apparatus according to a first mode.

In the vacuum degassing apparatus according to the first mode, it is preferred that the double-pipe structure for molten glass, which is utilized as the downfalling pipe or the extending pipe connected to the downfalling pipe, satisfy the following formula in at least the upstream end thereof:

$$W_{downstream} > W_{upstream}$$

(where $W_{downstream}$ is a width (mm) of a gap between the outer pipe and the inner pipe in a horizontal direction on a downstream side of a flow of molten glass, and $W_{upstream}$ is a width (mm) of a gap between the outer pipe and the inner pipe in the horizontal direction on the upstream side of the flow of molten glass).

In the vacuum degassing apparatus according to the first mode, it is preferred that $W_{downstream}$ and $W_{upstream}$ satisfy the following formula:

$$W_{downstream} \geq 2 \times W_{upstream}$$

The present invention also provides a vacuum degassing apparatus, which includes an uprising pipe, a vacuum degassing vessel and a downfalling pipe, including:

a downfalling pit connected to the downfalling pipe;

the downfalling pit being configured in a double-pipe structure comprising a pit body as an outer pipe and an inner pipe disposed in the pit body and extending downstream, the pit body including a drain-out.

In Description, the last-mentioned apparatus is referred to as the vacuum degassing apparatus according to a second mode.

In the vacuum degassing apparatus according to the second mode, it is preferred that an inner diameter $D_1$ (mm) of the downfalling pipe and an outer diameter $D_2$ (mm) of the inner pipe satisfy a relationship represented by the following formula:

$$D_1 > D_2$$

In the vacuum degassing apparatus according to the second mode, it is preferred that a difference $\Delta D$ (mm) between an inner diameter of the downfalling pipe and an outer diameter of the inner pipe, and an inner diameter $D_3$ (mm) of the inner pipe satisfy a relationship represented by the following formula:

$$\Delta D \geq 0.04 \times D_3$$

In the vacuum degassing apparatus according to the second mode, it is preferred that a difference $\Delta S$ (mm$^2$) in section obtained by subtracting a sectional area of a channel formed by the inner pipe from a sectional area of a channel formed by the downfalling pipe, and a sectional area $S_1$ (mm$^2$) of the channel formed by the inner pipe satisfy the relationship represented by the following formula:

$$\Delta S \leq S_1$$

In the vacuum degassing apparatus according to the second mode, it is preferred that the downfalling pipe and the inner pipe have overlapping portions each other; and a length L (mm) of the overlapping portions and an outer diameter $D_2$ (mm) of the inner pipe satisfy the relationship represented by the following formula:

$$L \leq 5 \times D_2$$

In the vacuum degassing apparatus according to the second mode, it is preferred that a distance d between a downstream end of the downfalling pipe and an upstream end of the inner pipe, and an outer diameter $D_2$ of the inner pipe satisfy the relationship represented by the following formula:

$$0.5 \times D_2 \leq d \leq 5 \times D_2$$

In the vacuum degassing apparatus according to the second mode, it is preferred that the downfalling pipe and the inner pipe satisfy the following formula in at least an upstream end of the inner pipe:

$$W_{1downstream} \geq W_{1upstream}$$

(where $W_{1downstream}$ is a width (mm) of a gap between the downfalling pipe and the inner pipe in a horizontal direction on a downstream side of a flow of molten glass, and $W_{1upstream}$ is a width (mm) of a gap between the downfalling pipe and the inner pipe in the horizontal direction on the upstream side of the flow of molten glass).

In the vacuum degassing apparatus according to the second mode, it is preferred that $W_{1downstream}$ and $W_{1upstream}$ satisfy the following formula:

$$W_{1downstream} \geq 2 \times W_{1upstream}$$

It is preferred that the vacuum degassing apparatus according to each of the first and second modes further include a flow-control member, which is disposed in the vacuum degassing vessel so as to have at lease one portion immersed in a surface layer of molten glass, and which directs a flow of the surface layer of the molten glass toward a side wall of the vacuum degassing vessel.

It is preferred that the flow-control member have a width set to satisfy the following formula in the surface layer of the molten glass and in a horizontal direction orthogonal to a flow of the molten glass:

$$W_1 < W_2$$

(where $W_1$ is a width (mm) of the flow-control member on a most upstream side of the flow-control member, and $W_2$ is a width (mm) of the flow-control member on a most downstream side of the flow-control member).

It is preferred that when the molten glass has an axis extending in a flow direction, a planar shape of the flow-control member be substantially axisymmetrical with respect to the axis.

It is preferred that the flow-control member have a most downstream end located at a position upstream a tube axis of the downfalling pipe in a flow direction of the molten glass.

It is preferred that a maximum value α of an angle included between a flow direction of the molten glass and a portion effective to direct the surface layer of the molten glass toward the side wall of the vacuum degassing vessel in a planar shape of the flow-control member satisfy the following formula:

$$15 \text{ degrees} \leq \alpha \leq 85 \text{ degrees}$$

It is preferred that the flow-control member satisfy the following formulas:

$$20 \text{ mm} \leq X$$

$$50 \text{ mm} \leq h$$

(where X is a depth of the flow-control member, by which the flow-control member is immersed in the surface layer of the molten glass, and h is a distance between a bottom of the vacuum degassing vessel and a bottom of the flow-control member).

It is preferred that two gaps $Y_1$ and $Y_2$ (mm) extending between side walls of the vacuum degassing vessel and a most downstream portion of the flow-control member in the surface layer of the molten glass in a direction orthogonal to a flow direction of the molten glass satisfy the following formulas:

$$Z \leq Y_1 \leq \phi/4$$

$$Z \leq Y_2 \leq \phi/4$$

(where φ is an inner diameter of the vacuum degassing vessel in the surface layer of the molten glass and in a horizontal direction orthogonal to a flow of the molten glass, and Z is φ/30 or X/2, whichever is smaller, wherein X is a depth, by which the flow-control member is immersed in the surface layer of the molten glass).

The present invention also provides a method for vacuum-degassing molten glass by use of the vacuum degassing apparatus according to the first mode or the second mode.

EFFECT OF THE INVENTION

In accordance with the conduit structure according to the present invention, it is possible to separate, from a main flow of molten glass, a boundary layer flow, which contains components eluted from a refractory brick, and foreign substances etc. generated in the interface between molten glass and a platinum wall surface forming a conduit for the molten glass. After that, it is possible to supply a forming apparatus with molten glass free of these foreign substances etc. by discharging the boundary layer flow through a drain-out. Thus, it is possible to produce quality glass products with defects minimized.

In accordance with the vacuum degassing apparatus according to the present invention, it is possible to separate, from the main flow of molten glass, a boundary layer flow of the molten glass containing components eluted from refractory bricks or foreign substances etc. generated in the interface between the molten glass and a platinum wall surface forming a conduit for the molten glass. After that, it is possible to supply the forming apparatus with molten glass free of these foreign substances etc. by discharging the boundary layer flow through the drain-out. Thus, it is possible to produce quality glass products with defects minimized.

In accordance with the vacuum degassing apparatus according to the present invention, it is possible to separate, from the main flow of molten glass, a boundary layer flow of the molten glass containing unbroken bubbles or a glass material denatured by volatilization, which forms a surface layer of the molten glass moving through a vacuum degassing vessel. After that, it is possible to supply the forming apparatus with molten glass free of these foreign substances etc. by discharging the boundary layer flow through the drain-out. Thus, it is possible to produce quality glass products with defects minimized.

When the vacuum degassing vessel according to the present invention has a flow control member disposed in the vacuum degassing vessel, it is possible to more effectively separate the boundary layer flow from the main flow of the molten glass.

BRIEF DESCRIPTION OF THE DRAWINGS

FIGS. 14(a) and 14(b) are a cross-sectional view of a vacuum degassing apparatus according to the present invention with only a vacuum degassing vessel, an uprising pipe and a downfalling pipe being shown, and a plan view of the vacuum degassing apparatus shown in FIG. 14(a) with an upper wall surface of the vacuum degassing vessel being omitted.

Figure 1:
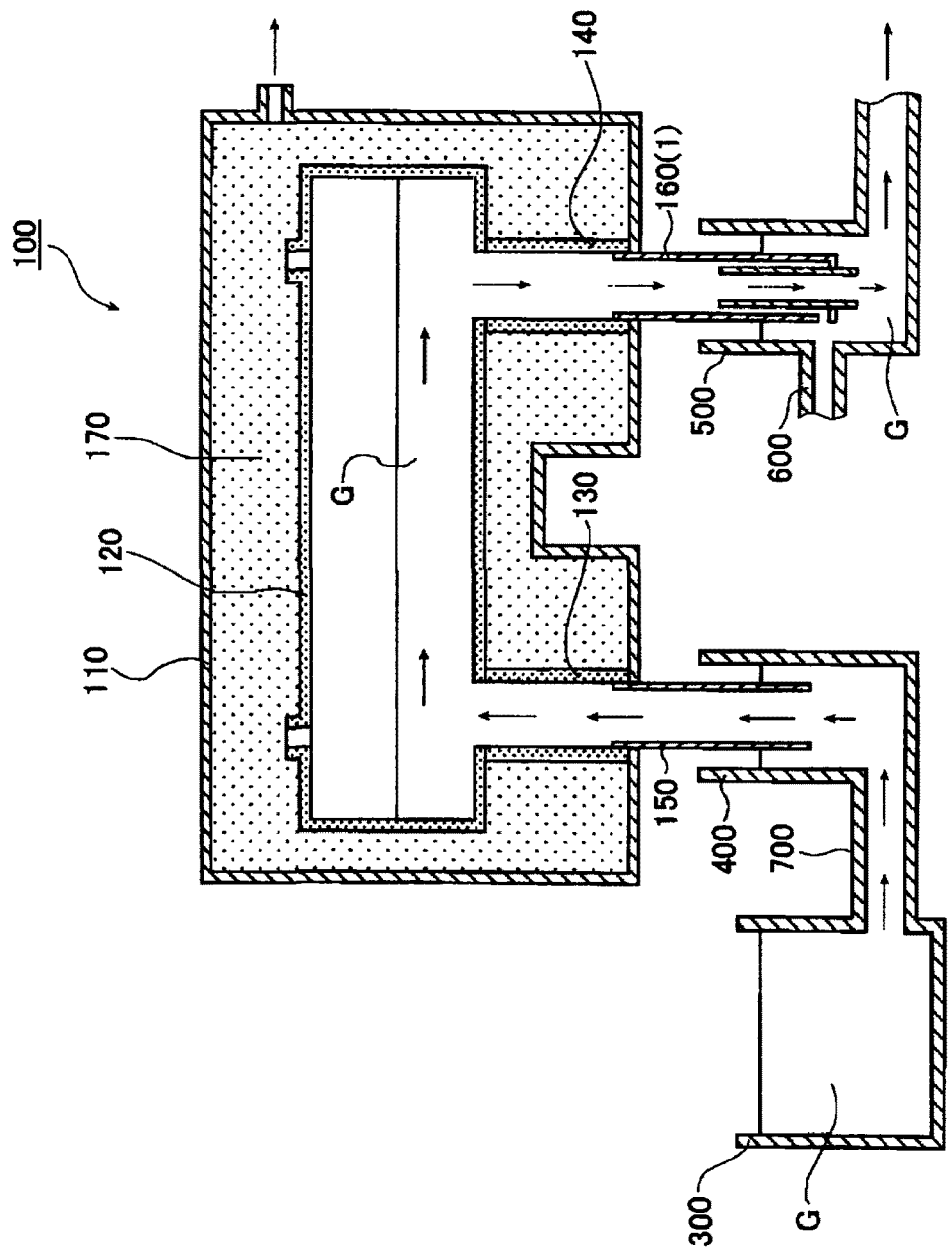
FIG. 1 is a cross-sectional view of a vacuum degassing apparatus including a conduit structure for molten glass according to the present invention.

| EXPLANATION OF REFERENCE NUMERALS | |
|---|---|
| 1, 2, 3, 4, 5: | Conduit structure |
| 1a, 2a, 3a, 4a, 5a: | Inner pipe |
| 1b, 2b, 3b, 4b, 5b: | Outer pipe |
| 6: | Conduit |
| 11, 21, 31, 41, 51: | Opening |
| 100, 100': | Vacuum degassing apparatus |
| 110: | Vacuum housing |
| 120: | Vacuum degassing vessel |
| 122, 122': | Flow-control member |
| 130: | Uprising pipe |
| 140: | Downfalling pipe |
| 150, 160, 160': | Extending pipe |
| 170: | Thermal insulating material |
| 180, 180', 180'', 180''': | Downstream pit |
| 181: | Pit body |
| 182, 181', 182'', 182''': | Inner pipe |
| 183, 600: | Drain-out |
| 300: | Melting vessel |
| 400: | Upstream pit |
| 500: | Downstream pit |
| 700: | Conduit |

BEST MODE FOR CARRYING OUT THE INVENTION

Now, the present invention will be described in reference to the accompanying drawings. FIG. 1 is a cross-sectional view of a vacuum degassing apparatus including a conduit structure for molten glass according to the present invention, i.e. the vacuum degassing apparatus according to a first mode of the present invention. The vacuum degassing apparatus 100 shown in FIG. 1 is used a process wherein molten glass G in a melting vessel 300 is vacuum-degassed and is continuously supplied to a successive treating vessel (not shown).

The vacuum degassing apparatus 100 is made of metal, such as a stainless steel, and has a vacuum housing 110 with the inside being kept under reduced pressure in use. In the vacuum housing 110, a vacuum degassing vessel 120 is housed so as to have a longitudinal axis extending in a horizontal direction. The vacuum degassing vessel 120 has an uprising pipe 130 and a downfalling pipe 140 mounted to lower sides of one end and the other end so as to vertically extend, respectively.

In the vacuum degassing apparatus 100, each of the vacuum degassing vessel 120, the uprising pipe 130 and the downfalling pipe 140 is formed of a hollow pipe made of refractory bricks, such as fused cast refractories, platinum or a platinum alloy.

When the vacuum degassing vessel 120 is formed of a hollow pipe made of refractory bricks, it is preferred that the vacuum degassing vessel 120 be formed of a hollow pipe configured with refractory bricks so as to have an outer shape having a rectangular section and an inner shape having a rectangular section to serve as a channel for molten glass.

When each of the uprising pipe 130 and the downfalling pipe 140 is formed of a hollow pipe made of refractory bricks, it is preferred that each of the uprising pipe 130 and the downfalling pipe 140 be formed of a hollow pipe configured with refractory bricks so as to have a polygonal section containing a circular section or a rectangular section and be formed in an inner shape having a circular section to serve as a channel for the molten glass.

On the other hand, the vacuum degassing vessel 120 is formed of a hollow pipe made of platinum or a platinum alloy, it is preferred that the vacuum degassing vessel 120 have an inner shape having a circular section or an oval section to serve as a channel for molten glass.

When each of the uprising pipe 130 and the downfalling pipe 140 is formed of a hollow pipe made of platinum or a platinum alloy, it is preferred that each of the uprising pipe 130 and the downfalling pipe 140 have an inner shape having a circular section or an oval section to serve as a channel for molten glass.

The uprising pipe 130 and the downfalling pipe 140 have extending pipes 150 and 160 mounted to lower ends (downstream ends) thereof, respectively. Each of the extending pipes 150 and 160 is formed of a circular hollow pipe made of platinum or a platinum alloy.

When the uprising pipe 130 and the downfalling pipe 140 are formed of hollow pipes made of platinum or a platinum alloy, the uprising pipe 130 and the downfalling pipe 140 may extend to locations corresponding to the extending pipes 150 and 160 shown in FIG. 1 without being connected to the extending pipes 150 and 160. In such a case, it should be noted that the explanation of the extending pipes 150 and 160 in Description is also applicable to the uprising pipe and the downfalling pipe made of platinum or a platinum alloy.

In the vacuum housing 110, the vacuum degassing vessel 120, the uprising pipe 130 and the downfalling pipe 140 have a thermal insulating material 170 disposed therearound.

The uprising pipe 130 communicates with the vacuum degassing vessel 120 to introduce the molten glass G from the melting vessel 300 into the vacuum degassing vessel 120. Accordingly, the lower end (downstream end) of the extending pipe 150 coupled to the uprising pipe 130 is put into an open end of an upstream pit 400 connected to the melting vessel 300 through a conduit 700 and is immersed in the molted glass G in the upstream pit 400.

The downfalling pipe 140 communicates with the vacuum degassing vessel 120 to draw out molten glass G after vacuum-degassing to a successive treating vessel (not shown). The lower end (downstream end) of the extending pipe 160 coupled to the downfalling pipe 140 is put into an open end of a downstream pit 500 and is immersed in the molten glass G in the downstream pit 500. The downstream pit 500 is connected to a drain-out 600. The drain-out means a device, which is formed of a discharge pipe and the like to discharge a part of the molten glass, specifically a part of molten glass with foreign substances etc. contained therein in order to increase the homogeneity of the molten glass.

Figure 2:
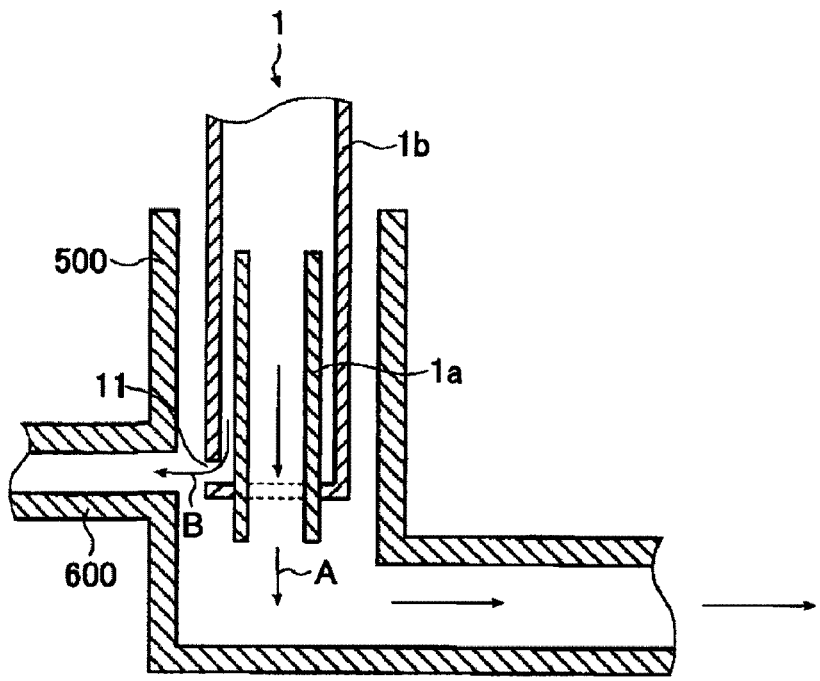
FIG. 2 is an enlarged view of a portion of a first conduit structure for the vacuum degassing apparatus 100 shown in FIG. 1 and its surroundings.

In the vacuum degassing apparatus 100 shown in FIG. 1, the extending pipe 160 coupled to the downfalling pipe 140 forms a first conduit structure 1 according to the present invention. FIG. 2 is an enlarged view of a portion of the conduit structure 1 and its surroundings.

The conduit structure 1 shown in FIG. 2 has a double-pipe structure formed of an inner pipe 1a and an outer pipe 1b at a portion close to a downstream end thereof. Each of the inner pipe 1a and the outer pipe 1b is formed of a circular hollow pipe made of platinum or a platinum alloy. Examples of the platinum alloy include a platinum-gold alloy and a platinum-rhodium alloy. The platinum or the platinum alloy may be a reinforced platinum with metal oxides dispersed in platinum or a platinum alloy. Examples of the dispersed metal oxides include metal oxides in Group 3, Group 4 and Group 13 in the Periodic Table, which are represented by $Al_2O_3$, $ZrO_2$ and $Y_2O_3$.

In the conduit structure 1 shown in FIG. 2, the inner pipe 1a has an upper end (upstream end) and a lower end (downstream end) formed as open ends.

The outer pipe 1b has a lower end (downstream end) has formed as a closed end in a region located in a gap between the outer pipe 1b and the inner pipe 1a, i.e. in a lower end (downstream end) of a gap space between the outer wall of the inner pipe 1a and the inner wall of the outer pipe 1b in the double-pipe structure. On the other hand, a portion of the lower end (downstream end of the outer pipe 1b, which is contained in the inner pipe 1a, i.e. is located inside the inner pipe 1a in shown FIG. 2) is formed as an open end. The inner pipe 1a has the lower end (downstream end) projecting from the lower end (downstream end) (closed end) of the outer pipe 1b. The outer pipe 1b has an upper end (upstream end) formed as an open end. Although the lower end (the downstream end) of the inner pipe 1a is shown to project from the lower end (downstream end) (closed end) of the outer pipe 1b, it is not essential that the lower end (downstream end) of the inner pipe 1a project from the lower end (downstream end) (closed end) of the outer pipe 1b. In other words, the lower end (downstream end) of the inner pipe may be formed not to project from the lower end (downstream end) (closed end) of the outer pipe in the double-pipe structure of the conduit structure according to the present invention.

The outer pipe 1b has an opening 11 formed in a portion close to the lower end (downstream end) (closed end) thereof.

More specifically, the outer pipe 1b has an opening 11 formed in a rectangular elongated shape in a portion of a side wall thereof close to the lower end (downstream end) (closed end) thereof so as to have longer sides in a circumferential direction of the outer pipe 1b than in a longitudinal direction of the outer pipe 1b. In FIG. 2, the opening 11 is located at substantially the same height as an opening of the drain-out 600 connected to the downstream pit 500. It is preferred that the opening 11 be located at substantially the same height as the opening of the drain-out 600 connected to the downstream pit 500 or that the opening 11 have an upper end (upstream end) located at a lower position than an upper end (on a downstream side in comparison with an upper end) of the opening of the drain-out.

In FIG. 2, the drain-out 600 is located on a lower end (a downstream end) of the conduit structure 1 according to the present invention. In the present invention, a structure including the conduit structure 1 and the drain-out 600 is referred to as the conduit structure for molten glass.

Since the foreign substances etc. flow as a boundary layer flow having a thickness of about 3 to 5 mm along the wall surface of the conduit without being uniformly dispersed in the molten glass as described above, when molten glass containing the boundary layer flow arrives at the double-pipe structure of the conduit structure 1 shown in FIG. 2, the boundary layer flow containing the foreign substances etc. moves into the gap space between the outer wall of the inner pipe 1a and the inner wall of the outer pipe 1b (hereinbelow, also referred to as "the gap space of the double-pipe structure"). On the other hand, a main flow portion of the molten glass except the boundary layer flow (hereinbelow, referred to as "the main flow") moves into a space inside the inner pipe 1a (hereinbelow, referred to as "the inner space of the inner pipe 1a"). Thus, the boundary layer flow and the main flow are physically separated from each other. It should be noted that the main flow means a glass flow free of the foreign substances etc. and, consequently, a portion of the molten glass finally utilized as products.

The main flow, which is moving in the inner space of the inner pipe 1a, moves in a direction indicated by an arrow A in this figure. In other words, the main flow passes through the lower end (downstream end) (open end) of the inner pipe 1a and moves in the downstream pit 500 in a downstream direction. On the other hand, the boundary layer flow, which is moving the gap space of the double-pipe structure, moves in a direction indicated by an arrow B in this figure. In other words, the boundary layer flow moves from the opening 11 formed in the inner wall (side wall) of the outer pipe 1b into the drain-out 600 via the downstream pit 500.

Thus, only the main flow, which has been separated from the boundary layer flow containing the foreign substances etc., is supplied to a forming apparatus. On the other hand, the boundary layer flow, which has moved into the drain-out 600, is discarded and utilized as glass cullet.

It should be noted that the following points be taken into account in order to properly separate the boundary layer flow and the main flow in the conduit structure according to the present invention. With respect to the following points, FIG. 3 should be referred to FIG. 3 is the same as FIG. 2 except that symbols indicating dimensions of respective parts are added.

Figure 3:
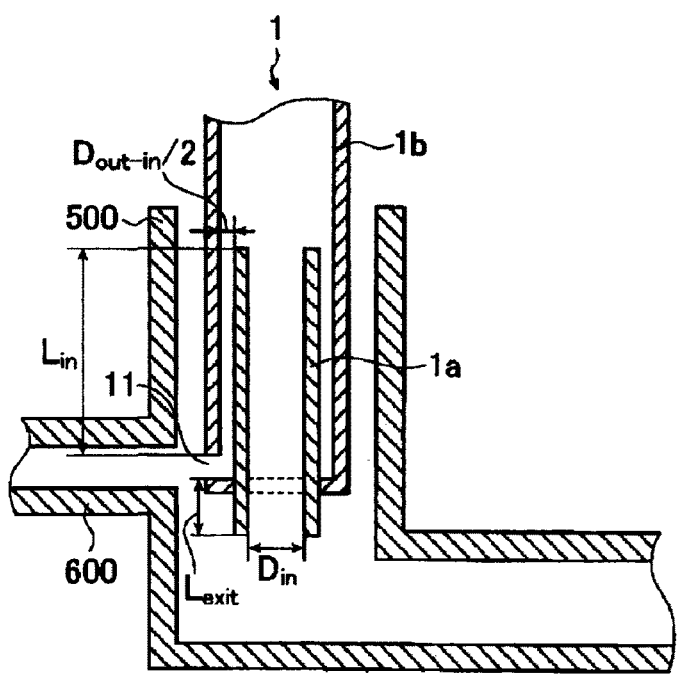
FIG. 3 is a view similar to FIG. 2, which shows dimensions of specific portions in the first conduit structure.

It is preferred that the inner pipe 1a shown in FIG. 3 project from the lower end (downstream end) (closed end) of the outer pipe 1b in order that the boundary layer flow from the opening 11 (indicated by the arrow B in FIG. 2) and the main flow of the molten glass from the inner pipe 1a (indicated by the arrow A in FIG. 2) are prevented from rejoining in the conduit structure 1 shown in FIG. 3.

When the distance between the opening 11 as the outlet for the boundary layer flow and the lower end (downstream end) of the inner pipe 1a as the outlet for the main flow is short, it is likely that the boundary layer flow and the main flow, which have been separated from each other by the double-pipe structure, rejoin, although depending on the position and the shape of the opening 11 formed in the side wall of the outer pipe 1b. When the inner pipe 1a sufficiently projects from the lower end (downstream end) (closed end) of the outer pipe 1b, the boundary layer flow and the main flow are unlikely to rejoin, and both flows can be reliably separated from each other since the lower end (downstream end) of the inner pipe 1a is sufficiently far from the opening 11.

It is preferred from the viewpoint of reliably separating the boundary layer flow and the main flow that the distance $L_{exit}$ between the lower end (downstream end) of the opening 11 and the lower end (downstream end) of the inner pipe 1a be 10 from 200 mm.

It is preferred from the viewpoint of physically separating the boundary layer flow and the main flow that the distance $L_{in}$ (mm) between the upper end (upstream end) of the inner pipe and the upper end (upstream end) of the opening, and the inner diameter $D_{in}$ (mm) of the inner pipe satisfy the relationship represented by the following formula (1):

$$L_{in} \geq D_{in}/2 \tag{1}$$

When $L_{in}$ and $D_{in}$ satisfy the relationship represented by the above-mentioned formula (1), the length of the double-pipe structure from the opening 11, more specifically, the length of the gap space of the double-pipe structure from the opening 11 is enough to physically separate the boundary layer flow and the main flow.

$D_{in}$ is normally 50 to 900 mm, preferably 100 to 700 mm, although depending on the size of the vacuum-degassing apparatus in particular the flow rate (ton/day) of molten glass passing through the apparatus. $L_{in}$ is preferably 50 mm or above, more preferably 100 mm or above and most preferably 200 mm or above and 1,500 mm or less. It should be noted that the conduit structure 1 may be configured in the double-pipe structure in the entire length thereof as long as it is acceptable in terms of cost. On the other hand, when $L_{in}$ is not longer than 500 mm, it is likely to have an adverse effect on separation of the boundary layer flow and the main flow since the length up to the opening 11 is insufficient.

In the conduit structure according to the present invention, $L_{in}$ and $D_{in}$ more preferably satisfy the relationship represented by the following formula (2) and further preferably satisfy the relationship represented by the following formula (3):

$$L_{in} \geq 1.0 \times D_{in} \tag{2}$$

$$1.0 \times D_{in} \leq L_{in} \leq 4 \times D_{in} \tag{3}$$

When the conduit structure 1 forms the extending pipe 160 coupled to the lower end (downstream end) of the downfalling pipe 140 as shown in FIG. 1 and FIG. 2, the entire length of the conduit structure 1 is normally 100 to 3,000 mm, more preferably 200 to 1,500 mm. When the vacuum degassing-apparatus 100 is operated, the vacuum-degassing vessel 120 is vertically moved by a distance of about 600 mm at the maximum in order to control the height of the liquid surface of the molten glass G in the vacuum-degassing vessel 120. During that time, the extending pipe 160 (the conduit structure 1) needs to have a leading end constantly immersed in the molten glass G in the downstream pit 500. As long as the length of the extending pipe 160 (the conduit structure 1) is in the above-mentioned range, the leading end of the extending pipe 160 (the conduit structure 1) is constantly immersed in the molten glass G in the downstream pit 500 even if the vacuum-degassing vessel 120 is vertically lifted to the maximum.

In order to physically separate the boundary layer flow and the main flow, it is preferred that the difference $D_{out-in}$ (mm) between the inner diameter of the outer pipe 1b and the outer diameter of the inner pipe 1a, and the inner diameter $D_{in}$ (mm) of the inner pipe 1a satisfy the relationship represented by the following formula (4). In this formula, $D_{out-in}/2$ corresponds to the width of the gap space of the double-pipe structure (the width of the gap between the outer pipe 1b and the inner pipe 1a).

$$D_{out-in}/2 \geq 0.02 \times D_{in} \quad (4)$$

As long as $D_{out-in}$ and $D_{in}$ satisfy the relationship represented by the above-mentioned formula (4), the width of the gap space of the double-pipe structure is enough to physically separate the boundary layer flow and the main flow.

The boundary layer flow has a thickness of about 3 to 5 mm, although it slightly varies according to the temperature or the viscosity of the molten glass, the material forming the channel or the like. The inventors have found that the above-mentioned relationship is needed in order to prevent the boundary layer flow from is mixing in the main flow.

Specifically, $D_{out-in}/2$ is preferably 5 mm or more, more preferably 10 mm or more, and preferably 100 mm or less. It is not recommendable to set $D_{out-in}/2$ at a value beyond 100 mm since the width of the gap space of the double-pipe structure to the thickness of the boundary layer flow becomes excessive to increase the amount of a portion of the main flow, which is separated and moves into the gap space of the double-pipe structure, with the result that the yield of produced glass decreases.

In the conduit structure 1 shown in FIG. 2, it is preferred that only the boundary layer flow be separated and move into the gap space of the double-pipe structure. In order to attain this state, it is ideal that the width of the gap space of the double-pipe structure is substantially the same as the thickness of the boundary layer flow. The inventors have found that components eluted from a refractory brick, foreign substances caused in the interface with a platinum wall surface, and bubbles formed in the interface between a conduit wall surface and the molten glass flow as a boundary layer flow having a thickness of e.g. about 3 to 5 mm along the wall surface of the conduit without being uniformly dispersed in the molten glass.

However, the thickness of the boundary layer flow during vacuum-degassing is not always constant and varies in some cases. For this point of view, in order to reliably separate the boundary layer flow and move the boundary layer flow into the gap space of the double-pipe structure, the width of the gap space of the double-pipe structure is preferably greater than the thickness of the boundary layer flow to some degree. In this case, a portion of the main flow is also separated and moves into the gap space of the double-pipe structure.

When the width of the gap space of the double-pipe structure is too much greater than the thickness of the boundary layer flow, the amount of a portion of the main flow, which is separated and moves into the gap space of the double-pipe structure, increases, thus reducing the yield of produced glass, which is not preferred.

In the conduit structure according to the present invention, $D_{out-in}$ and $D_{in}$ more preferably satisfy the relationship represented by the following formula (5), further preferably satisfy the relationship represented by the following formula (6).

$$D_{out-in}/2 \geq 0.04 \times D_{in} \quad (5)$$

$$0.04 \times D_{in} \leq D_{out-in}/2 \leq 0.25 \times D_{in} \quad (6)$$

$D_{in}$ is normally 50 to 900 mm, more preferably 100 to 700 mm as described above. Each of the inner pipe 1a and the outer pipe 1b, which is made of platinum or a platinum alloy, has a thickness of preferably 0.4 to 6 mm, more preferably 0.8 to 4 mm.

From this point of view, the inner pipe 1a has an outer diameter of preferably 55 to 905 mm, more preferably 105 to 705 mm. The outer pipe 1b has an outer diameter of preferably 70 to 1,200 mm, more preferably 100 to 1,000 mm.

In order to physically separate the boundary layer flow and the main flow, it is preferred that the distance $L_{in}$ (mm) from the upper end (upstream end) of the inner pipe to the upper end (upstream end) of the opening, and the difference $D_{out-in}$ (mm) between the inner diameter of the outer pipe and the outer diameter of the inner pipe satisfy the relationship represented by the following formula (7).

$$L_{in} \geq (D_{out-in}/2) \times 3 \quad (7)$$

When $L_{in}$ and $D_{out-in}$ satisfy the above-mentioned relationship, the length $L_{in}$ of the gap space of the double-pipe structure from the opening 11 is enough to physically separate the boundary layer flow and the main flow from the viewpoint of the relationship with the width ($D_{out-in}/2$) of the gap space of the double-pipe structure.

It is also preferred that formula of $D_{out-in} \times 20 \geq L_{in}$ be satisfied.

In order to physically separate the boundary layer flow and the main flow, it is preferred that the sectional area difference $S_{out-in}$ (mm$^2$) obtained by subtracting the sectional area of the channel formed by the inner pipe 1a from the sectional area of the channel formed by the outer pipe 1b, and the sectional area $S_{in}$ (mm$^2$) of the channel formed by the inner pipe 1a satisfy the relationship represented by the following formula (8).

$$S_{out-in} \leq S_{in} \quad (8)$$

The sectional areas of the channels formed by the outer pipe 1b and the inner pipe 1a are sectional areas in a direction orthogonal to the longitudinal direction of the channels formed by the outer pipe 1b and the inner pipe 1a. When $S_{out-in}$ and $S_{in}$ satisfy the relationship represented by formula (8), the amount of a portion of the main flow, which is separated and moves into the gap space of the double-pipe structure, is prevented from increasing. Thus, the yield of produced glass is prevented from reducing.

$S_{out-in}$ and $S_{in}$ preferably satisfy the relationship represented by the following formula (9), and more preferably satisfy the relationship represented by the following formula (10).

$$S_{out-in} \leq 0.09 \times S_{in} \quad (9)$$

$$S_{out-in} \leq 0.80 \times S_{in} \quad (10)$$

It is also preferred that formula of $0.50 \times S_{in} \leq S_{out-in}$ be satisfied.

In order to physically separate the boundary layer flow and the main flow, it is preferred that the area S (mm$^2$) of the opening 11 and the inner diameter $D_{out}$ (mm) of the outer pipe satisfy the relationship represented by the following formula (11).

$$S \geq 9 \times D_{out} \quad (11)$$

The area S of the opening 11 is a projected area, which is obtained by projecting the opening 11 on a plane.

When S and $D_{out}$ satisfy the relationship represented by the above-mentioned formula (11), the flow resistance of the boundary layer flow during passing through the opening 11 is prevented from significantly increasing since the opening 11 is enough to flow out the molten glass passing through the gap space between the outer pipe 1b and the inner pipe 1a. When the opening 11 is extremely small, the flow resistance of the boundary layer flow during passing through the opening 11 significantly increases. In such a case, there is a significant difference between fluidity between the boundary layer flow moving through the gap space of the double-pipe structure and the main flow moving through in the inner pipe 1a, thus having an adverse effect on separation of the boundary layer flow and the main flow. The above-mentioned formula (11) is a formula found by considering that molten glass having a thickness of 3 mm or more needs to be flowed out from the opening when the boundary layer flow has a thickness of 3 mm.

In the conduit structure according to the present invention, S and $D_{out}$ more preferably satisfy the relationship represented by the following formula (12), furthermore preferably satisfy the relationship represented by the following formula (13).

$$S \geq 12 \times D_{out} \quad (12)$$

$$20 \times D_{out} \leq S \leq 90 \times D_{out} \quad (13)$$

When S is greater than $90 \times D_{out}$, it is likely that the boundary layer flow and the main flow, which have been separated by the double-pipe structure, rejoin since the size of the opening 11 is too large in comparison with the inner diameter of the outer pipe 1b.

It is preferred that the opening 11 be formed in the vicinity of the closed end. The vicinity of the closed end contains not only the closed end of the outer pipe 1a but also a portion of the inner wall (side wall) close to the closed end of the outer pipe 1a as shown in FIG. 2. The phrase of "a portion of the inner wall (side wall) close to the closed end" means a portion of the outer pipe 1a within a range of 200 mm from the closed end of the outer pipe 1a.

When the opening 11 is formed in the vicinity of the closed end, it is possible to increase the distance required to physically separate the boundary layer flow and the main flow, and consequently to obtain homogeneous glass.

The opening 11 does not always need to be formed at a single location and may be formed at plural locations. When the opening is formed at plural locations, it is sufficient that at least one of the openings is formed within a range of 200 mm from the closed end of the outer pipe 1a.

When the opening 11 is formed in a rectangular shape, it is preferred from the viewpoint of a reduction in the flow resistance of the boundary layer flow during passing through the opening 11 that the opening be not in a rectangular shape elongated in the longitudinal direction of the outer pipe 1b (i.e. a vertically long rectangular shape) but in a rectangular shape elongated in the circumferential direction of the outer pipe 1b (i.e., a horizontally long rectangular shape).

The opening 11 is not limited to be formed in a rectangular shape and may be formed in any of the other shapes. For example, the opening may be formed in a square shape, a circular shape or an oval shape. The opening may be formed in any of the other polygonal shape, such as a triangular shape, a pentagon shape, a hexagonal shape or an octagon shape.

It is preferred that the opening 11 have a length in the circumferential direction of the outer pipe 1b (i.e. a width) set to be shorter than the width of the opening of the drain-out 600. When the width of the opening 11 is greater than the width of the opening of the drain-out 600, it is likely that the boundary layer flow and the main flow, which have been separated from each other by the double-pipe structure, rejoin.

The width of the opening 11 is the width of a profile, which is obtained by projecting the opening 11 on a plane. It should be noted that when the opening of the drain-out 600 is a curved shape, the width of the opening of the drain-out 600 is also the width of a profile, which is obtained by projecting the opening of the drain-out 600 on a plane.

In FIG. 2, the opening 11 formed in the outer pipe 1b is located in the vicinity of the opening of the drain-out 600, more specifically at substantially the same height as the opening of the drain-out 600. It is preferred that the upper end (upstream end) of the opening 11 be located below (downstream) the upper end (upstream end) of the opening of the drain-out 600, more specifically the upper end of the opening 11 be located below (downstream) the upper end of the opening of the drain-out by a distance of 0 to 500 mm. In order that the boundary layer flow and the main flow, which have been separated from each other by the double-pipe structure, are prevented from rejoining, it is preferred that the upper end (upstream end) of the opening 11 be located further below (downstream) the upper end (downstream end) the opening of the drain-out 600.

Since the vacuum degassing vessel 120 is vertically moved by a distance of about 600 mm at the maximum during operating the vacuum degassing apparatus 100 shown in FIG. 1 as described above, the positional relationship between the opening 11 and the opening of the drain-out 600 is variable to some degree from the positional relationship shown in FIG. 2. However, it is preferred that even if the vacuum-degassing vessel 120 is vertically moved, the opening 11 be not too far from the opening of the drain-out 600 in order that the boundary layer flow and the main flow, which have been separated from each other by the double-pipe structure, are prevented from rejoining. The distance between the upper end (upstream end) of the opening 11 and the upper end (upstream end) of the opening of the drain-out 600 is preferably 400 mm or less, more preferably 200 mm or less at the maximum.

In order that the boundary layer flow, which has flowed out from the opening 11, is prevented from rejoining the main flow, it is necessary to set the area of the opening of the drain-out 600 at a certain value. Specifically, it is preferred that the area of the opening of the drain-out 600 and the area S of the opening 11 satisfy the relationship represented by the following formula (14) where the area of the opening of the drain-out 600 is $S_{drain}$.

$$S_{drain} \geq S \quad (14)$$

As described above, components eluted from a refractory brick, and foreign substances etc. generated in the interface between the molten glass and a platinum wall surface forming the conduit for molten glass flow as a boundary layer flow having a thickness along the wall surface of the conduit without being uniformly dispersed in the molten glass.

However, in the vacuum-degassing apparatus 100 shown in FIG. 1, the boundary layer flow, which arrives at the extending pipe 160 from the vacuum-degassing vessel 120 via the downfalling pipe 140, i.e. at the conduit structure 1 shown in FIG. 2, has different thicknesses according to different portions of the conduit structure 1 in some cases.

Unbroken bubbles or glass materials denatured by volatilization exist on the molten glass G, and these materials form a surface layer of a flow of the molten glass G moving through the vacuum-degassing vessel 120. The surface layer of the molten glass G containing such unbroken bubbles or such glass materials denatured by volatilization collides with a side wall of the vacuum-degassing vessel 120 or a wall surface of a downstream end portion of the vacuum-degassing vessel 120 to be unified with the boundary layer flow along the wall surface, which has been referred to in Description.

Accordingly, the molten glass G tends to move into the downfalling pipe 140 in such a way to turn along the wall surface of a downstream end of the vacuum degassing vessel 120 when moving into the downfalling pipe 140. Thus, there is a tendency that a portion of the boundary layer flow along the wall surface of the downfalling pipe 140 on a downstream side in the horizontal flow of the molten glass (hereinbelow, referred to as "the horizontal downstream side") has a larger volume than a portion of the boundary layer flow along the wall surface of the downfalling pipe 140 on an upstream side in the horizontal flow of the molten glass (hereinbelow, referred to as "the horizontal upstream side"). In other words, there is a tendency that such a portion of the boundary layer flow along the wall surface of the downfalling pipe 140 on the horizontal downstream side has a greater thickness than such a portion of the boundary layer flow along the wall surface of the downfalling pipe 140 on the horizontal upstream side. Since this state is also maintained in the boundary layer flow that has moved into the extending pipe 160 from the downfalling pipe 140, there is a tendency that a portion of the boundary layer flow along the wall surface of the extending pipe 160 on the horizontal downstream side has a greater thickness than a portion of the boundary layer flow along the wall surface of the extending pipe 160 on the horizontal upstream side.

In the conduit structure according to the present invention, when setting the width of the gap space of the double-pipe structure, it is preferred to take into account the above-mentioned behavior of the boundary layer flow in the vacuum degassing apparatus 1, i.e. that the boundary layer flow moving through the downfalling pipe 140 and the extending pipe 160 has a greater thickness on the horizontal downstream side than on the horizontal upstream side.

Figure 4:
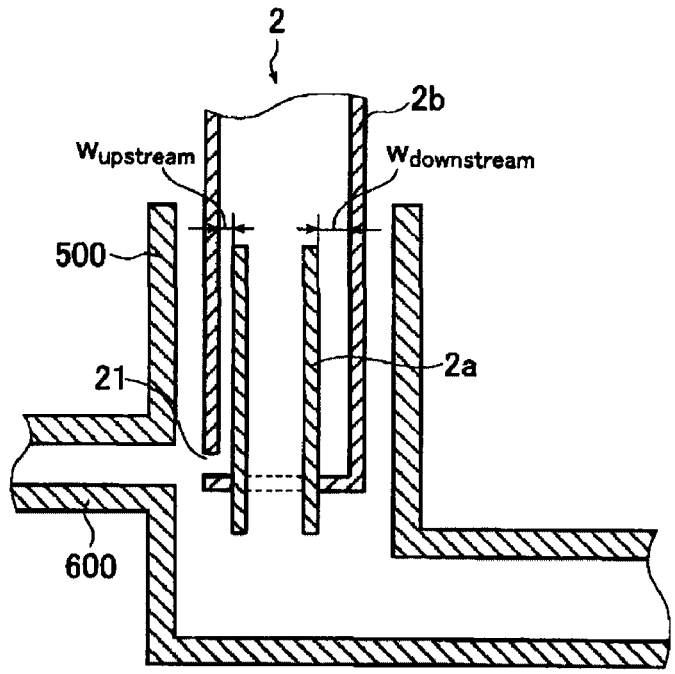
FIG. 4 is a cross-sectional view showing the conduit structure according to another embodiment of the present invention, which is different from the first conduit structure shown in FIG. 2 in the width of a double-pipe structure.

FIG. 4 is a cross-sectional view showing the conduit structure according to another embodiment of the present invention. In the conduit structure 2 shown in FIG. 4, the gap space of the double-pipe structure has a right-hand width in this figure, i.e. a width $w_{downstream}$ on the downstream side in the horizontal flow of the molten glass set to be greater than a left-hand width in this figure, i.e. a width $w_{upstream}$ on the upstream side in the horizontal flow of the molten glass so as to satisfy the relationship represented by the following formula (15)

$$w_{downstream} > w_{upstream} \quad (15)$$

When the right-hand and left-hand widths of the gap space of the double-pipe structure are set so as to satisfy the above-mentioned formula (15) in the conduit structure according to the present invention, even if the boundary layer flow, which moves through the extending pipe 160, i.e. through the conduit structure according to the present invention, has a greater thickness on the horizontal downstream side than on the horizontal upstream side, it is possible to properly separate the boundary layer flow and the main flow.

In the conduit structure 2 shown in FIG. 4, it is more preferred that the right-hand and left-hand widths of the gap space of the double-pipe structure be set so as to satisfy the following formula (16).

$$w_{downstream} \geq 2 \times w_{upstream} \quad (16)$$

In order to perform the intended function in the conduit structure 2 shown in FIG. 4, i.e. in order to properly separate the boundary layer flow and the main flow even if the boundary layer flow, which moves through the conduit structure, has a greater thickness on the horizontal downstream side than on the horizontal upstream side, it is sufficient that the right-hand and left-hand widths of the gap space in an upstream end portion of the double-pipe structure satisfy the above-mentioned formula (15), and it is not necessary that the right-hand and left-hand widths of the gap space in the remaining portion of the double-pipe structure satisfy the above-mentioned formula (15). However, in this case, the boundary layer flow moving the gap space is likely to be subjected to pressure loss since the right-hand and left-hand widths of the gap space of the double-pipe structure vary along the moving direction of the flow of molten glass. From this point of view, it is preferred that the right-hand and left-hand widths of the gap space of the double-pipe structure satisfy the above-mentioned formula (15) throughout the moving direction of the flow of molten glass.

Examples of the method for setting the right-hand and left-hand widths of the gap space of the double-pipe structure so as to satisfy the above-mentioned formula (15) include a method of disposing the inner pipe 1b in the outer pipe 1a so as to be offset toward the horizontal upstream side, and a method of using an outer pipe 1a or an inner pipe 1b partly having an enlarged portion or a reduced portion in section in a direction orthogonal to the flow of molten glass so as to partly expand the width of the gap space of the double-pipe structure on the horizontal downstream side.

It should be noted that the relationships represented by the above-mentioned formulas (1) to (14) are also applied to the conduit structure 2 shown in FIG. 4.

In the conduit structure according to the present invention, each of the inner pipe 1a and the outer pipe 1b forming the double-pipe structure may be formed in any shape as long as both pipes are hollow pipes made of platinum or a platinum alloy and satisfy the following conditions (1) to (3).

(1) The inner pipe 1a has both upstream and downstream ends formed as open ends.

(2) In the outer pipe 1b, a portion of the downstream end, which is positioned in a region located in the gap between the outer pipe 1b and the inner pipe 1a (the gap space between the outer wall of the inner pipe 1a and the inner wall of the outer pipe 1b), is formed as a closed end, and the other portion of the downstream end, which is positioned in a region located in the inner pipe 1a (a portion locating inside the inner pipe 1a) is formed as an open end in the double-pipe structure.

(3) The outer pipe 1b has the above-mentioned opening formed at a portion close to the downstream end.

Each of the inner pipe 1a and the outer pipe 1b may be formed in an oval shape, a quadrangular shape, a hexagonal shape or an octagon shape in section.

Figure 5:
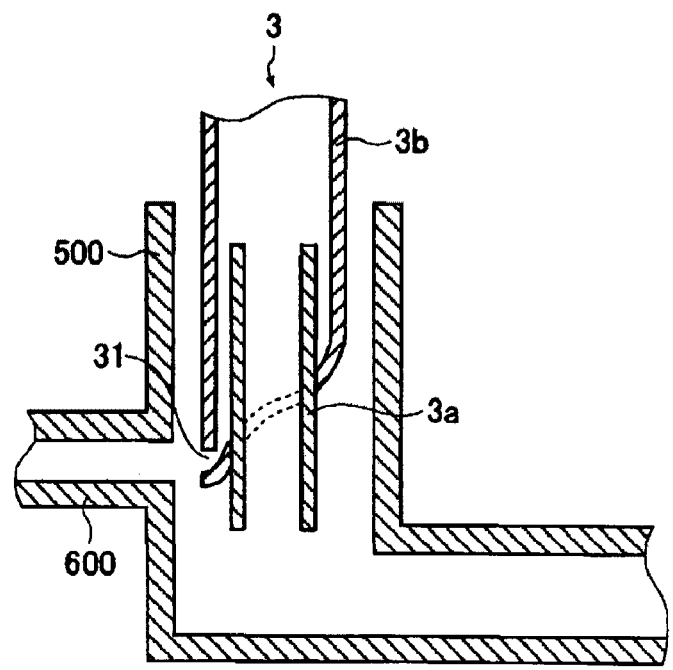
FIG. 5 is a cross-sectional view showing the conduit structure according to another embodiment of the present invention, which is different from the first conduit structure shown in FIG. 2 in the shape of the closed end of an outer pipe.

Although the closed end (lower or downstream end) of the outer pipe 1b is formed as a horizontal end in FIG. 2, the closed end of the outer pipe is not limited to have such a shape. FIG. 5 is a cross-sectional view showing the conduit structure according to another embodiment of the present invention, wherein the closed end of the outer pipe is formed in a different shape from the conduit structure 1 shown in FIG. 2. Although the conduit structure 3 shown in FIG. 5 is the same as the conduit structure 1 shown in FIG. 2 in that the double-pipe structure is formed of an inner pipe 3a and an outer pipe 3b, the outer pipe 3b has a closed end (lower or downstream end) formed so as to be slant.

More specifically, the outer pipe 3b has a longer length in a portion of the lower end (downstream end) on a side facing the drain-out 600 formed in the downstream pit 500 (a portion of the lower end (downstream end) on the left side in this figure; hereinbelow, also referred to as "the long edge") than in a portion of the lower end (downstream end) on the side opposite the long edge (a portion of the lower end (downstream end) on the right side in this figure; hereinbelow, also referred to as "the short edge") in a longitudinal direction thereof, so that the lower end is slant so as to connect between the long edge and the short edge. The outer pipe 3b has an opening 31 formed in a portion of a side wall thereof close to the long edge. In the conduit structure shown in FIG. 5, the boundary layer flow, which moves through the gap space of the double-pipe structure, is guided toward the opening 31 along the slant lower end (downstream end) of the outer pipe 3b.

Both open ends of the inner pipe 3b, i.e. the upper end (upstream end) and the lower end (downstream end) of the inner pipe 3b may be formed to be slant. For example, when the upper end (upstream end) of the inner pipe 3a is formed to be slant so that a portion of the upper end (upstream end) remote from the opening 31 is lower than a portion of the upper end (upstream end) close to the opening 31 in FIG. 5, the following effect is obtained. When it is assumed that the upper end (upstream end) of the inner pipe 3a is not slant, the boundary layer flow moving through the gap space of the double-pipe structure is likely to be subjected to pressure loss since the distance of the boundary layer flow moving in a portion of the gap space remote from the opening 31 is longer than the distance of the boundary layer flow moving in a portion of the gap space close to the opening 31 with respect to the distance that the boundary layer flow moves through the gap space of the double-pipe structure up to the opening 31. When the upper end (upstream end) of the inner pipe 3a is formed to be slant so that a portion of the upper end (upstream end) remote from the opening 31 is lower than a portion of the upper end (upstream end) close to the opening 31, the boundary layer flow moving through the gap space of the double-pipe structure is unlikely to be subjected to pressure loss since the difference between the distance of the boundary layer flow moving in a portion of the gap space remote from the opening 31 and the distance of the boundary layer flow moving in a portion of the gap space close to the opening 31 is reduced.

The above-mentioned formulas (1) to (16) are also applied to the conduit structure 3 shown in FIG. 5. In the conduit structure 3 shown in FIG. 5, the distance $L_{exit}$ between the lower end (downstream end) of the opening and the lower end (downstream end) of the inner pipe corresponds to the distance between the lower end (downstream end) of the opening 31 and the lower end (downstream end) of the inner pipe 3a. The distance $L_{in}$ between the upper end (upstream end) of the inner pipe 3a and the upper end (upstream end) of the opening 31, the inner diameter $D_{in}$ of the inner pipe 3a, the difference $D_{out-in}$ between the inner diameter of the outer pipe 3b and the outer diameter of the inner pipe 3a, the cross-sectional areas of the channels formed of the inner pipe 3a and the outer pipe 3b, the area S of the opening 31 and the area $S_{drain}$ of the opening of the drain-out 600 are the same as those of the conduit structure 1 shown in FIG. 2.

Figure 6:
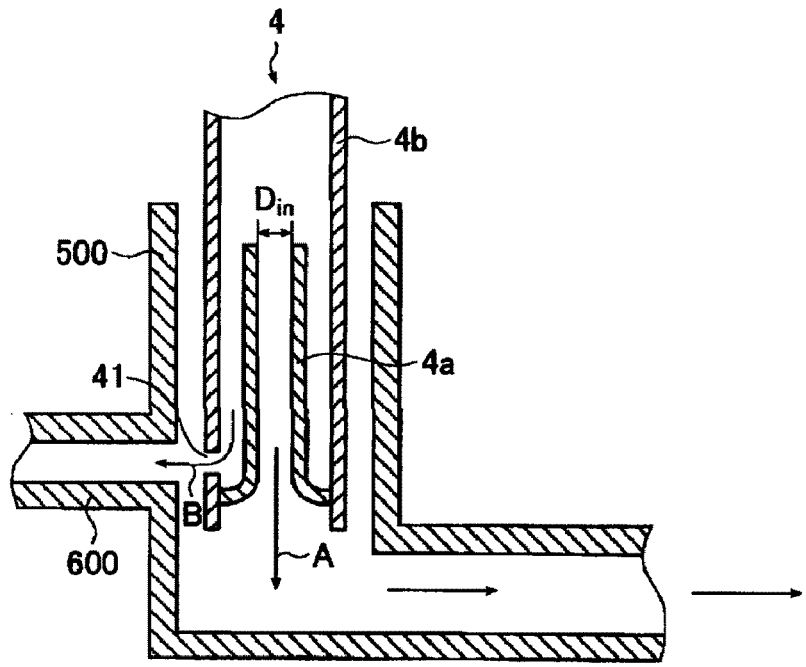
FIG. 6 is a cross-sectional view showing the conduit structure according to another embodiment of the present invention, which is different from the first conduit structure shown in FIG. 2 in the shape of an inner pipe.

Although each of the inner pipes 1a, 2a, 3a is shown as being a straight-sided and circular hollow pipe having the same diameters (inner and outer diameters) in the entire portion thereof in FIG. 2 to FIG. 5, the inner diameter is not limited to have such a shape. FIG. 6 is a cross-sectional view showing the conduit structure according to another embodiment of the present invention, wherein the inner diameter has a different shape from the conduit structures 1, 2 and 3 shown in FIG. 2 to FIG. 5. The conduit structure 4 shown in FIG. 6 is the same as the conduit structures 1, 2 and 3 shown in FIG. 2 to FIG. 5 in that the double-pipe structure is formed of an inner pipe 4a and an outer pipe 4b. However, in the conduit structure 4 shown in FIG. 6, the inner pipe 4a has a portion thereof (a portion close to a lower end or downstream end in this figure) enlarged in a taper shape. The lower end (downstream end) of the inner pipe 4a in such a taper shape is jointed to the inner wall of the outer pipe 4b with the result that the gap space between the outer wall of the inner pipe 4a and the inner wall of the outer pipe 4b has a lower end (downstream end) formed as a closed end. In other another words, the lower end (downstream end) of the inner pipe 4a does not project is from the closed end of the outer pipe 4b. In the conduit structure 4 shown in FIG. 6, the boundary layer flow, which moves through the gap space of the double-pipe structure, is guided toward an opening 41 along the outer wall of the inner pipe 4a formed in such a taper form.

The above-mentioned formulas (1) to (16) are also applied to the conduit structure 4 shown in FIG. 6. In the conduit structure 4 shown in FIG. 6, the inner diameter $D_{in}$ of the inner pipe 4a corresponds to the inner diameter of an unenlarged portion of the inner diameter 4a. The distance $L_{in}$ between the upper end (upstream end) of the inner pipe 4a and the upper end (upstream end) of the opening 41, the difference $D_{out-in}$ between the inner diameter of the outer pipe 4b and the outer diameter of the inner pipe 4a, the cross-sectional areas of the channels formed of the inner pipe 4a and the outer pipe 4b, the area S of the opening 41 and the area $S_{drain}$ of the opening of the drain-out 600 are the same as those of the conduit structure 1 shown in FIG. 2.

Figure 7:
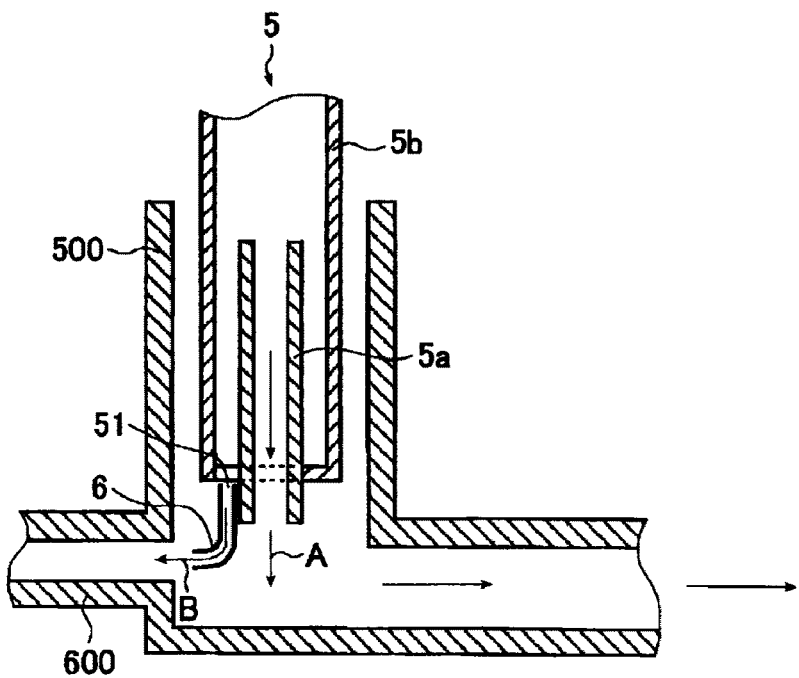
FIG. 7 is a cross-sectional view showing the conduit structure according to another embodiment of the present invention.

Although the boundary layer flow, which has flowed out of each of the openings 11, 21, 31 and 41 formed in a portion of each of the outer pipes 1b, 2b, 3b and 4b close to the lower end (downstream end), is prevented from rejoining the main flow by locating the openings 11, 21, 31 and 41 in the vicinity of the opening of the drain-out 600 in each of the conduit structures 1 to 4 shown in FIG. 2 to FIG. 6, a conduit 6 may be disposed so that the boundary layer flow flowing out of an opening 51 is directly directed to the opening of the drain-out 600 as in the conduit structure 5 shown in FIG. 7. In the conduit structure 5 shown in FIG. 7, the opening 51 is formed in a portion of the closed end, not in the side wall of the outer pipe 5b.

The conduit structure 5 shown in FIG. 7 is excellent in reliably separating the main flow and the boundary layer flow, although being complicated in terms of structure.

When the conduit 6 is disposed so that the boundary layer flow flowing out of the opening 51 is directly directed to the opening the drain-out 600 as in the conduit structure shown in FIG. 7, the opening of the drain-out 600 is not always formed in the side wall of the downstream pit 500 and may be formed in a left corner of the bottom of the downstream pit 500 in FIG. 7 for example.

Each of the conduit structures 1, 2, 3 and 4 shown in FIG. 2 to FIG. 6 has each of the openings 11, 21, 31 and 41 formed at a single location in the side wall of each of the outer pipes 1b, 2b, 3b and 4b close to the lower end (downstream end), while the conduit structure 5 shown in FIG. 7 has the opening 51 formed at a single location in a portion of the closed end of the outer pipe 5b. It should be noted that the opening is not always formed at a single location but may be formed at plural locations. In the latter case, the plural openings may be formed so as to be side by side at the same height in the outer pipe 1b (in other words, on both right and left sides) or may be formed at different heights in a single location in the circumferential direction of the outer pipe 1b (in other words vertically). The plural openings may be formed in a combined manner (i.e. at upper, lower, right and left positions).

When the downstream pit 500 includes another drain-out on the opposite side of the drain-out 600 (a right-hand wall surface of the downstream pit 500) in FIG. 2, the outer pipe 1b may have another opening formed in a portion of the lateral side opposite the opening 11. Likewise, the outer pipe may have plural openings formed in the side wall close to the lower end (downstream end).

When there are plural openings, $L_{exit}$ corresponds to the distance between the lower end (downstream end) of the opening at the lowest (most downstream) position and the lower end (downstream end) of the inner pipe 1a. $L_{in}$ corresponds to the distance the upper end (upstream end) of the opening at the highest (most upstream) position and the upper end (upstream end) of the inner pipe. S corresponds to the total sum of the areas of all openings. It should be noted that the above-mentioned formula (14) is applied to paired openings (paired openings formed in a portion of the outer pipe close to the lower end and in the drain-out).

Explanation has been made about a case where the conduit structure according to the present invention is applied to the extending pipe coupled to the lower end (downstream end) of the downfalling pipe. It should be noted that the conduit structure according to the present invention is also applicable to the downfalling pipe per se.

In the vacuum-degassing apparatus, the downfalling pipe is formed of a hollow pipe made of platinum or a platinum alloy in some cases. In theses cases, the downfalling pipe made of platinum or a platinum alloy may utilize the conduit structure according to the present invention.

When the downfalling pipe is formed of a hollow pipe made of platinum or a platinum alloy, plural hollow pipes are normally jointed to form a single downfalling pipe. The conduit structure according to the present invention may be applied to the hollow pipe on a lower (downstream) side among the plural hollow pipes forming such a single downfalling pipe. It should be noted that the conduit structure according to the present invention may be applied to a downfalling pipe formed of a single hollow pipe made of platinum or a platinum alloy.

The dimensions and the like in the conduit structure described about in a case where the conduit structure according to the present invention is applied to the extending pipe coupled to the downfalling pipe are also applicable.

The applications of the conduit structure according to the present invention are not limited to the downfalling pipe and the extending pipe coupled to the lower end (downstream end) of the downfalling pipe in a vacuum-degassing apparatus. The conduit structure according to the present invention is also applicable to the other conduits for molten glass contained in a glass-producing apparatus than the downfalling pipe and the extending pipe thereof.

The conduits for molten glass in a glass-producing apparatus are all formed of refractory bricks or made of platinum or a platinum alloy. For this reason, it is likely that components eluted from a refractory brick is mixed into molten glass G or foreign substances etc. are generated in the interface between a platinum wall surface and the molten glass in all conduits for molten glass forming the glass-producing apparatus.

The vacuum-degassing vessel 120 with the inside depressurized, and the uprising pipe 110 and the downfalling pipe 140 connected to the vacuum-degassing vessel 120 are one of the sources of elution of components from a refractory brick and generation of foreign substances etc. in the interface of a platinum wall surface and molten glass since components of the molten glass are apt to volatilize therein.

The glass-producing apparatus also includes other portions where components of molten glass volatilize, with the result that it is likely that components are eluted from a refractory brick or foreign substances etc. are generated in the interface between a platinum wall surface and the molten glass.

An example of such portions is a melting vessel 300 in the structure shown in FIG. 1. Another example is a stirring vessel disposed in a channel for molten glass in a glass-producing apparatus.

The conduit structure according to the present invention may be used for a purpose for physically separating a boundary layer flow from the main flow of molten glass, the boundary layer flow containing foreign substances etc. generated in such portions. For example, the conduit structure according to the present invention is applicable to the conduit 700 connecting between the melting vessel 300 and the upstream pit 400.

In the vacuum-degassing apparatus according to the first mode of the present invention, the conduit structure according to the present invention is applied to an extending pipe coupled to a downfalling pipe made of refractory bricks, or to a downfalling pipe per se made of platinum or a platinum alloy. In this sense, the vacuum-degassing apparatus 100 shown in FIG. 1 is an example of the vacuum-degassing apparatus according to the first mode of the present invention.

In the vacuum-degassing apparatus according to the is first mode of the present invention, there is no limitations to the entire structure except for the conduit structure according to the present invention, i.e., an extending pipe coupled to a downfalling pipe made of refractory bricks, or a downfalling pipe made of platinum or a platinum alloy.

Now, the vacuum-degassing apparatus according to a second mode of the present invention will be described.

Figure 8:
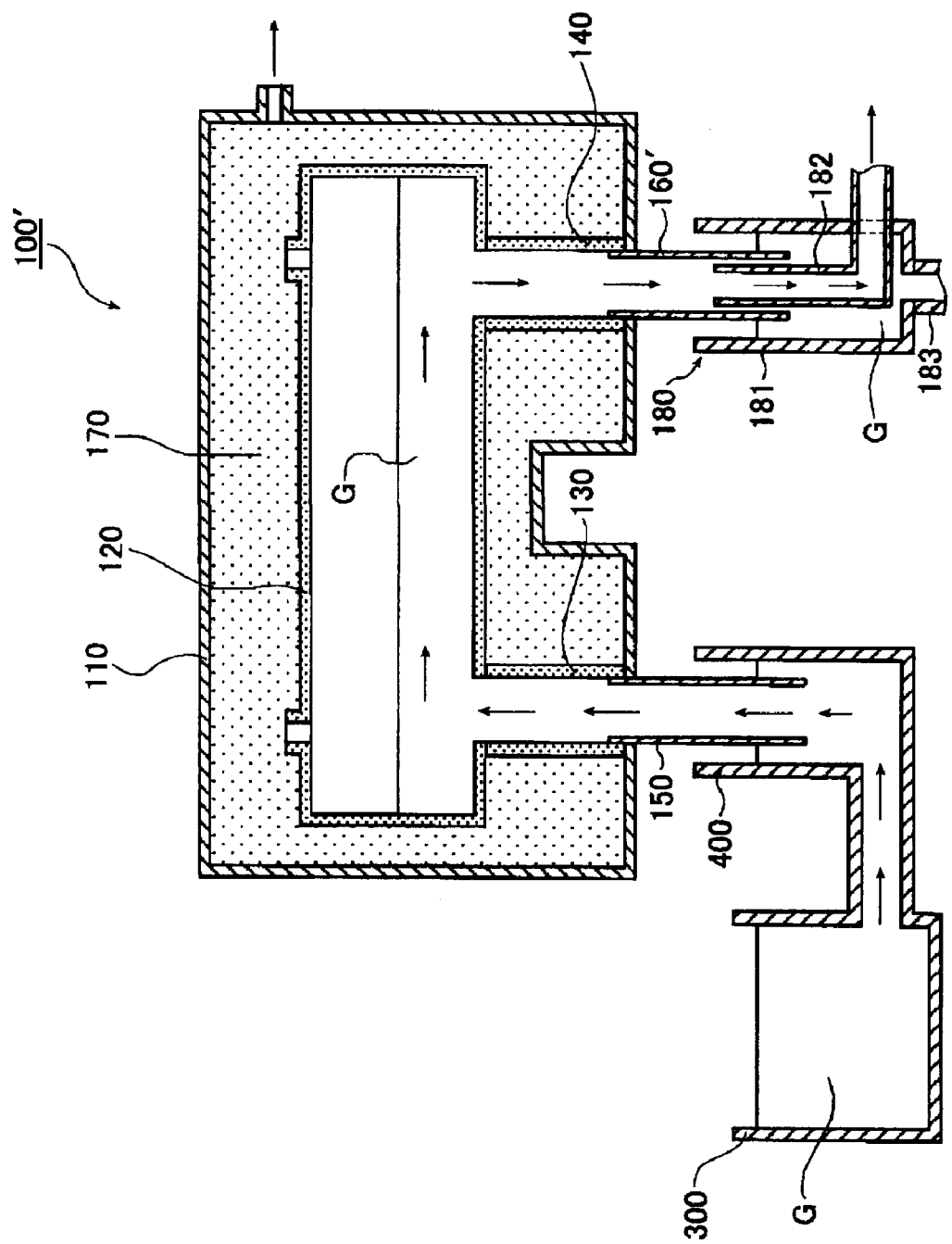
FIG. 8 is a cross-sectional view showing the vacuum degassing apparatus according to a second mode of the present invention.

FIG. 8 is a cross-sectional view showing the vacuum-degassing apparatus according to the second mode of the present invention. The vacuum-degassing apparatus 100' shown in FIG. 8 is the same as the vacuum-degassing apparatus 100 shown in FIG. 1 except for the differences listed below:

The extending pipe 160' coupled to the lower end (downstream end) of the downfalling pipe 140 has no double-pipe structure.

The downstream pit 180 has a structure described later.

Figure 9:
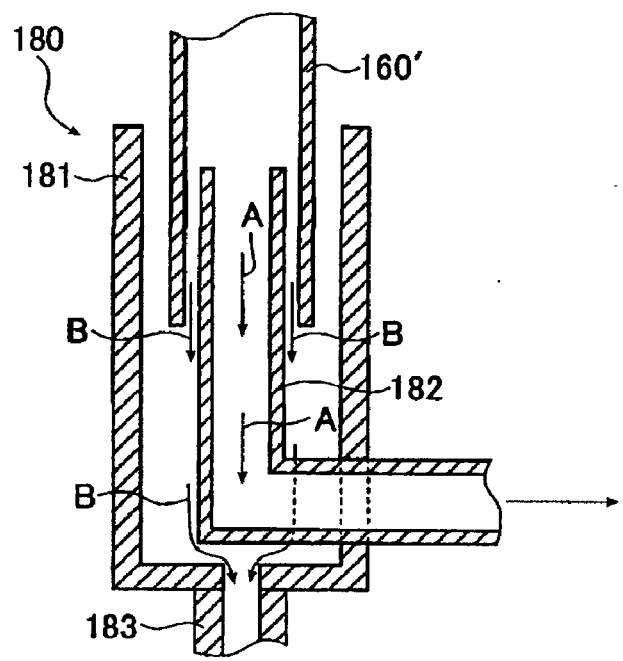
FIG. 9 is an enlarged view showing a portion of a downstream pit 180 of the vacuum degassing apparatus 100' shown in FIG. 8 and its surroundings.

FIG. 9 is an enlarged view showing the downstream pit 180 and its surroundings in the vacuum-degassing apparatus 100' shown in FIG. 8.

The downstream pit 180 shown in FIG. 9 is formed in a double-pipe structure formed of a pit body 181 as an outer pipe and an inner pipe 182 located in the pit body 181 and extending in a downstream direction. By adopting the above-mentioned double-pipe structure, a boundary layer flow, which contains components eluted from a refractory brick and foreign substances etc. generated in the interface with a platinum wall surface, are separated from the main flow of molten glass, more specifically in the molten glass that moves from the downfalling pipe 160' to the downstream pit 180.

The pit body 181 is formed of a bottomed cylindrical body having an opening formed in an upper end (upstream end), and the opening of the upper end (upstream end) is formed in a polygonal shape, such as a quadrangular shape, or a circular shape. The pit body 181 has a drain-out 183 connected to a bottom thereof.

The inner pipe 182 is formed of a cylindrical hollow pipe, which has both ends opened and formed in, e.g. a circular shape in section. The inner pipe 182 has one end positioned the upstream side in the flow direction of the molten glass, i.e. at a position close to the downfalling pipe 140, more specifically in the extending pipe 160' coupled to the lower end (downstream end) of the downfalling pipe 140 and the other end passing through a side wall of the pit body 181 and extending in a downstream direction in the flow direction of the molten glass. The inner pipe 182 is formed in a substantially L-character shape as a whole.

Each of the pit body 181, the inner pipe 182 and the drain-out 183 is normally made of platinum or a platinum alloy. When each of the pit body 181, the inner pipe 182 and the drain-out 183 is made of platinum or a platinum alloy, it is preferred in terms of easy manufacturing, resistance to deformation etc. that each of these members be formed in a circular shape or an oval shape in section.

It should be noted that each of the pit body, the inner pipe 182 and the drain-out 183 may be formed of refractory bricks, such as fused cast refractories. When each of the pit body 181, the inner pipe 182 and the drain-out 183 is made of refractory bricks, it is preferred in terms of easy manufacturing, corrosion resistance in the refractory bricks etc. that each of the members be formed in a polygonal shape, such as a quadrangular shape, a circular shape or an oval shape in section.

In FIG. 9, the extending pipe 160' and the inner pipe 182 have overlapping portions with each other. More specifically, both pipes overlap with each other in such a way that the inner pipe 182 has an upper end portion (upstream end portion) positioned in the extending pipe 160'. It is not essential that the extending pipe 160' and the inner pipe 162 have such overlapping portions, and both pipes may have no overlapping portions.

Although the extending pipe 160', which is mounted to the lower end (downstream end) of the downfalling pipe 140 and is made of platinum or a platinum alloy, is immersed in the molten glass in the downstream pit 180 is (in the pit body 181) in the vacuum-degassing apparatus 100' shown in FIG. 8 since the downfalling pipe 160 is formed of refractory bricks, the downfalling pipe made of platinum or a platinum alloy is immersed in the molten glass in the downstream pit in some vacuum-degassing apparatuses. In such cases, the downfalling pipe made of platinum or a platinum alloy overlaps directly with the inner pipe in the downstream pit.

In Description, the phrase "the downfalling pipe overlaps with the inner pipe in the downstream pit" means to cover both cases described in the following items (a) and (b).

(a) The extending pipe, which is mounted to a lower end portion (downstream end portion) of a downfalling pipe formed of refractory bricks, overlaps with the inner pipe in the downstream pit.

(b) A downfalling pipe made of platinum or a platinum alloy overlaps directly with the inner pipe in the downstream pit.

In the vacuum-degassing apparatus according to the second mode, the following point should be noted in order to properly separate the boundary layer flow and the main flow. With respect to the following point, FIG. 10 should be referred to FIG. 10 is the same as FIG. 9 except that symbols indicating dimensions of respective parts are added.

Figure 10:
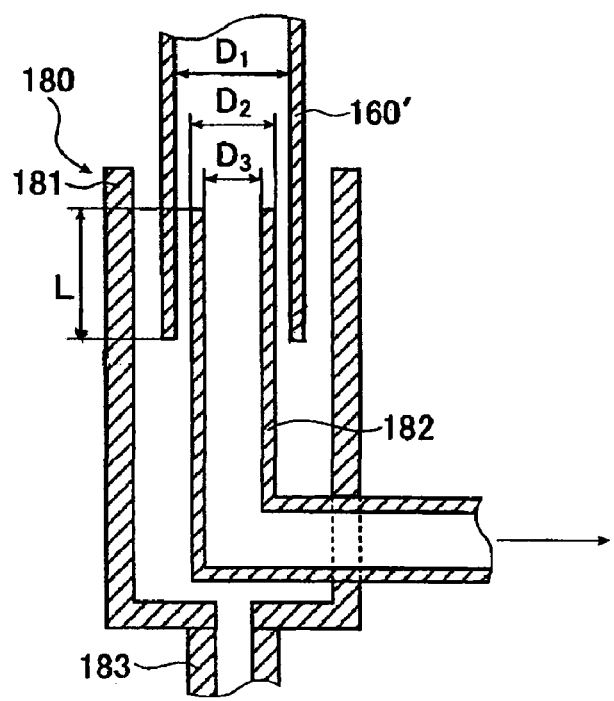
FIG. 10 is a view similar to FIG. 9, which shows symbols indicating dimensions of specific portions in this figure.

In FIG. 10, it is preferred that the inner diameter is $D_1$ of the extending pipe 160' and the outer diameter $D_2$ of the inner pipe 182 satisfy the relationship represented by the following formula (17).

$$D_1 > D_2 \qquad (17)$$

In other words, when the extending pipe (or the downfalling pipe) overlaps with the inner pipe in the downstream pit in the vacuum degassing apparatus according to the second mode, the inner pipe in the downstream pit is combined with the extending pipe to have the upper end portion (upstream portion) positioned in the extending pipe.

When the inner pipe is combined with the extending pipe in the vacuum-degassing apparatus according to the second mode as described above, the following advantages are obtained.

When the flow of molten glass containing the boundary layer flow arrives at the overlapping portions of the extending pipe 160' and the inner pipe 182 in FIG. 9, the boundary layer flow, which contains components eluted from a refractory brick, and foreign substances etc. generated in the interface with a platinum wall surface, moves into a region located in the gap between the inner wall of the extending pipe 160' and the outer wall of the inner pipe 182, i.e. into a gap space between the inner wall of the extending pipe 160' and the outer wall of the inner pipe 182 (indicated by arrows B in this figure) since such components eluted from a refractory brick, and such foreign substances etc. generated in the interface with a platinum wall surface flow as a boundary layer flow having a thickness of about 3 to 5 mm along the wall surface of a conduit without being uniformly dispersed in the molten glass as described above. On the other hand, the main flow with the boundary layer flow removed therefrom moves through the inner pipe 182 (indicated by arrows A in this figure). Thus, the boundary layer flow and the main flow are physically separated from each other.

The main flow in the inner pipe 182 moves along a direction indicated by the arrows A in this figure. In other words, the main flow moves downstream in the inner pipe 182. On the other hand, the boundary layer flow, which moves in the gap space between the inner wall of the extending pipe 160' and the outer wall of the inner pipe 182, moves along a direction indicated by the arrows B in this figure and is discharged through the drain-out 183.

Thus, only the main flow, which has been separated from the boundary layer flow containing such components eluted from a refractory brick and bubbles generated in the interface with a platinum wall surface, is supplied to a forming apparatus. On the other hand, the boundary layer flow, which is discharged through the drain-out 183, is discarded and utilized as glass cullet.

In order to physically separate the boundary layer flow and the main flow, it is preferred that the difference $\Delta D$ (mm) between the inner diameter $D_1$ of the extending pipe 160' and the outer diameter $D_2$ of the inner pipe 182, and the inner diameter $D_3$ (mm) of the inner pipe 182 satisfy the relationship represented by the following formula (18).

$$\Delta D \geq 0.04 \times D_3 \qquad (18)$$

When $\Delta D$ and $D_3$ satisfy the relationship represented by the above-mentioned formula (18), the width of the gap space between the inner wall of the extending pipe 160' and the outer wall of the inner pipe 182, i.e. $\Delta D/2$ is set enough to physically separate the boundary layer flow and the main flow.

Specifically, the $\Delta D$ is preferably 10 mm or more, more preferably 20 mm or more and most preferably 40 mm or more and 200 mm or less. When ΔD is set at a value beyond 200 mm, the flow rate of the main flow is unfavorably reduced since the width of the gap space between the inner wall of the extending pipe 160' and the outer wall of the inner pipe 182 becomes too great with respect to the thickness of the boundary layer flow.

In the conduit structure 1 shown in FIG. 9, it is preferred that only the boundary layer flow be separated and move in the gap space between the inner wall of the extending pipe 160' and the outer wall of the inner pipe 182. In order to attain this state, it is ideal that the width of the gap space between the inner wall of the extending pipe 160' and the outer wall of the inner pipe 182 be set to be substantially the same as the thickness of the boundary layer flow.

However, the thickness of the boundary layer flow during vacuum-degassing is not always constant and varies in some cases. From this point of view, in order to reliably separate the boundary layer flow and move the boundary layer flow in the gap space between the inner wall of the extending pipe 160' and the outer wall of the inner pipe 182, it is preferred that the width of the gap space be set to be greater than the thickness of the boundary layer flow to some extent. In such a case, a portion of the main flow is also separated and moves into the gap space.

When the width of the gap space between the inner wall of the extending pipe 160' and the outer wall of the inner pipe 182 is set to be much greater than the thickness of the boundary layer flow, the amount of a separated portion of the main flow, which moves into the gap space, increases, reducing the yield of produced glass, which is not preferred.

In the vacuum-degassing apparatus according to the second mode, ΔD and $D_3$ more preferably satisfy the relationship represented by the following formula (19) and most preferably satisfy the relationship represented by the following formula (20).

$$\Delta D \geq 0.08 \times D_3 \quad (19)$$

$$0.1 \times D_3 \leq \Delta D \leq 0.6 \times D_3 \quad (20)$$

$D_3$ is normally 50 to 900 mm, preferably 100 to 700 mm. The inner pipe 182 and the extending pipe 160', which are made of platinum or a platinum alloy, have a thickness of preferably 0.4 to 6 mm, more preferably 0.8 to 4 mm.

From this point of view, the outer diameter $D_2$ of the inner pipe 182 is preferably 51 to 912 mm, more preferably 102 to 708 mm. The outer diameter of the extending pipe 160' is preferably 60 to 1,300 mm, more preferably 123 to 1,000.

In order to physically the boundary layer flow and the main flow, it is preferred that the difference ΔS (mm²) in section obtained by subtracting the sectional area of the channel formed by the inner pipe 182 from the sectional area of the channel formed by the extending pipe 160', and the sectional area $S_1$ (mm²) of the channel formed by the inner pipe 182 satisfy the relationship represented by the following formula (21).

$$\Delta S \leq S_1 \quad (21)$$

The sectional area of the channel formed by the extending pipe 160' and the sectional area of the channel formed by the inner pipe 182 mean sectional areas orthogonal to the longitudinal directions of the channel formed by the extending pipe 160' and the channel formed by the inner pipe 182, respectively. When ΔS and $S_1$ satisfy the relationship represented by formula (21), the width of the gap space between the inner wall of the extending pipe 160' and the outer wall of the inner pipe 182 is prevented from being too larger than the thickness of the boundary layer flow, with the result that the amount of a separated portion of the main flow, which moves into the gap space, is prevented from increasing. Thus, it is possible to prevent the yield of produced glass from being reduced.

It is preferred that the formula of $0.05 \times S_1 \leq \Delta S$ be satisfied.

In the vacuum-degassing apparatus according to the second mode, it is preferred that there be overlapping portions. The presence of such overlapping portions advantageously increases the effect of separating the boundary layer flow and the main flow.

It is preferred that the length L (mm) of the overlapping portions and the outer diameter $D_2$ (mm) of the inner pipe 182 satisfy the following formula (22).

$$L \geq 0.5 \times D_2 \quad (22)$$

In order to adjust the height of the liquid level of the molten glass G in the vacuum-degassing vessel 120 during operation of the vacuum-degassing apparatus 100', the vacuum-degassing vessel 120 is vertically moved by a distance of about 500 mm at the maximum. In this time, the extending pipe 160' is vertically moved according to the displacement of the vacuum-degassing vessel 120. Accordingly, the length L of the overlapping portions varies according to the displacement of the vacuum-degassing vessel 120. When the vacuum-degassing vessel 120 is elevated to the maximum, L is minimum.

In all cases containing a case where L is minimum, it is preferred that L and $D_2$ satisfy the relationship represented by the above-mentioned formula (22). It should be noted that L may be zero (in other words, the extending pipe 160' and the inner pipe 182 do not overlap with each other) as described above.

Considering the probability that the upper end portion (upstream portion) of the inner tube is put into the extending pipe (the downfalling pipe) too deeply, it is preferred that L satisfy the following formula (23).

$$L \leq 5 \times D_2 \quad (23)$$

When L and $D_2$ satisfy the relationship represented by the above-mentioned formula (23) in all cases containing a case where L is minimum, the gap space between the inner wall of the extending pipe 160' and the outer wall of the inner pipe 182 has a length set to be enough to physically separate the boundary layer flow and the main flow irrespective of the displacement of the vacuum-degassing vessel 120. Even when the vacuum-degassing vessel 120 is vertically moved to the maximum, the extending pipe 160' has a leading end constantly immersed in the molten glass G in the downstream pit 180 (the pit body 181).

Although $D_2$ varies according to the size of the vacuum-degassing apparatus, in particular the flow rate (ton/day) of the molten glass passing through the vacuum-degassing apparatus, $D_2$ is normally 51 to 912 mm, preferably 102 to 708 mm. L is preferably 30 mm or more and 1,000 mm or less, more preferably 50 mm or more and 700 mm or less. Even when L is set at value beyond 1,000 mm, only a small contribution is given to separation of the boundary layer flow and the main flow, and the cost increases since the length of the overlapping portions is significantly long.

The length of the extending pipe 160' per se is normally 200 to 3,000 mm, preferably 400 to 1,500 mm. There is no limitation to the length of the inner pipe 182 since the inner pipe extends downstream in this figure. However, the length of the inner pipe 182 is preferably 50 to 600 mm, more preferably 100 to 500 mm.

As described above, the boundary layer flow, which contains components eluted from a refractory brick, and foreign substances etc. generated in the interface between molten glass and a platinum wall surface forming a conduit for molten glass, forms a surface layer of the molten glass G moving through the vacuum-degassing vessel 120. For this reason, the molten glass G tends to move into the downfalling pipe 140 in such a way to turn along the wall surface of the downstream end of the vacuum-degassing vessel 120 when moving into the downfalling pipe 140. Thus, there is a tendency that a portion of the boundary layer flow along the wall surface of the downfalling pipe 140 on the downstream side in the horizontal flow of the molten glass is greater than a portion of the boundary layer flow along the wall surface of the downfalling pipe 140 on the upstream side in the horizontal flow of the molten glass. In other words, there is a tendency that such a portion of the boundary flow along the wall surface of the downfalling pipe 140 on the horizontal downstream side has a greater thickness than a such a portion of the boundary layer flow along the wall surface of the downfalling pipe 140 on the horizontal upstream side. Since this state is also maintained in the boundary layer flow that has moved into the extending pipe 160' from the downfalling pipe 140, there is a tendency that a portion of the boundary layer flow along the wall surface of the extending pipe 160' on the horizontal downstream side has a greater thickness than a portion of the boundary layer flow along the wall surface of the extending pipe 160' on the horizontal upstream side.

In the conduit structure according to the second mode, when setting the width of the gap space between the inner wall of the extending pipe 160' and the outer wall of the inner pipe 182, it is preferred to take into account the above-mentioned behavior of the boundary layer flow in the vacuum degassing apparatus 1', i.e. that the boundary layer flow moving through the downfalling pipe 140 and the extending pipe 160' has a greater thickness on the horizontal downstream side than on the horizontal upstream side.

Figure 11:
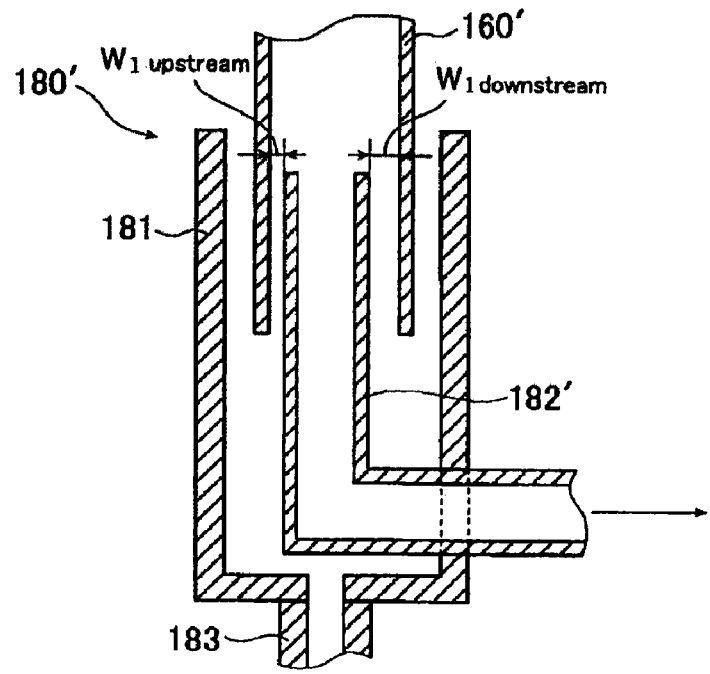
FIG. 11 is an enlarged view showing the downstream pit according to another embodiment in the vacuum degassing apparatus according to the second mode and its surroundings, which are different from the embodiment shown in FIG. 9 in the width of a gap space between the inner wall of an extending pipe and the outer wall of an inner pipe.

FIG. 11 is a cross-sectional view showing the conduit structure according to another embodiment of the second mode. In FIG. 11, the gap space between the inner wall of the extending pipe 160' and the outer wall of the inner pipe 182 has a right-hand width in this figure, i.e. a width $w_{1downstream}$ on the downstream side in the horizontal flow of the molten glass set to be greater than a left-hand width in this figure, i.e. a width $w_{1upstream}$ on the upstream side in the horizontal flow of the molten glass so as to satisfy the relationship represented by the following formula (24)

$$w_{1downstream} > w_{1upstream} \quad (24)$$

When the right-hand and left-hand widths of the gap space between the inner wall of the extending pipe 160' and the outer wall of the inner pipe 182 are set so as to satisfy the above-mentioned formula (24) in the vacuum degassing apparatus according to the second mode, even if the boundary layer flow, which moves through the extending pipe 160', has a greater thickness on the horizontal downstream side than on the horizontal upstream side, it is possible to properly separate the boundary layer flow and the main flow.

In FIG. 11, it is more preferred that the right-hand and left-hand widths of the gap space between the inner wall of the extending pipe 160' and the outer wall of the inner pipe 182 be set so as to satisfy the following formula (25).

$$w_{1downstream} \geq 2 \times w_{1upstream} \quad (25)$$

In order to perform the intended function in FIG. 11, i.e. in order to properly separate the boundary layer flow and the main flow even if the boundary layer flow, which moves through the extending pipe 160', has a greater thickness on the horizontal downstream side, it is sufficient that the right-hand and left-hand widths of the gap space between the inner wall of the extending pipe 160' and the outer wall of the inner pipe 182 at upstream parts of the overlapping portions satisfy the above-mentioned formula (24), and it is acceptable that the widths of the gap space do not satisfy the above mentioned formula (24) in the remaining parts of the overlapping portions. However, since the widths of the gap space vary along the moving direction of the flow of molten glass in the latter case, it is likely that the boundary layer flow, which moves through the gap space, is subjected to pressure loss. From this point of view, it is preferred that the widths of the gap space between the inner wall of the extending pipe 160' and the outer wall of the inner pipe 182 satisfy the above-mentioned formula (24) throughout the entire overlapping portions in the moving direction of the flow of molten glass.

Examples of the method for setting the right-hand and left-hand widths of the gap space between the inner wall of the extending pipe 160' and the outer wall of the inner pipe 182 so as to satisfy the above-mentioned formula (24) include a method of disposing the inner pipe 182 in the extending pipe 160' so as to be offset toward the horizontal upstream side, and a method of using an extending pipe 160' partly having an enlarged portion in section in a direction orthogonal to the flow of molten glass so as to partly expand the width of the gap space the gap space between the inner wall of the extending pipe 160' and the outer wall of the inner pipe 182 or an inner pipe 182 partly having a reduced portion in section in a direction orthogonal to the flow of molten glass.

It should be noted that the above-mentioned formulas are also applied to the embodiment shown in FIG. 11.

In the vacuum-degassing apparatus according to the second mode, the downstream pit may be configured in a double-pipe structure formed of the pit body as the outer tube and the inner pipe disposed in the pit body and extending downstream. The vacuum degassing apparatus according to the second mode is not limited to an arrangement wherein the extending pipe 160' and the inner pipe 182 overlap with each other as shown in FIG. 9.

Figure 12:
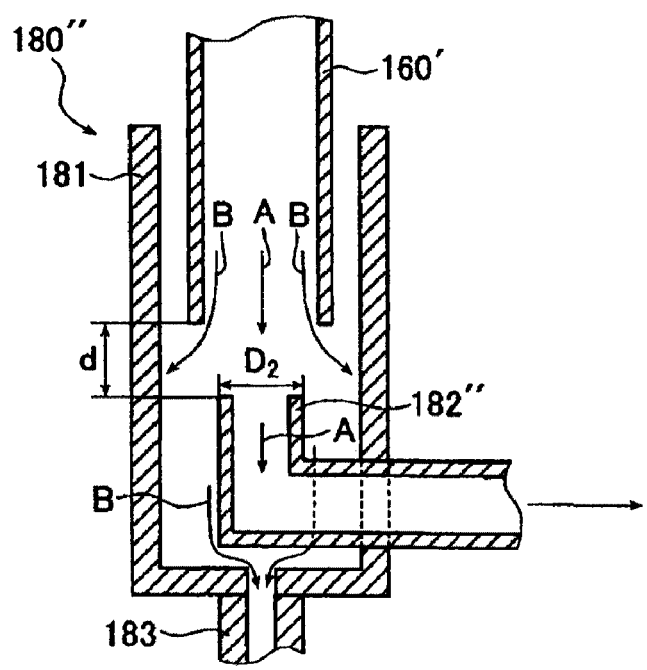
FIG. 12 is an enlarged view showing a portion of the downstream pit according to another embodiment in the vacuum degassing apparatus according to the second mode and its surroundings, which are different from the embodiment shown in FIG. 9 in the relationship between an extending pipe and an inner pipe.

FIG. 12 is an enlarged view showing the downstream pit according to another embodiment of the vacuum-degassing apparatus according to the second mode and its surroundings. This embodiment is the same as the embodiment shown in FIG. 9 except that the extending pipe and the inner pipe have a different relationship.

In the embodiment shown in FIG. 12, the extending pipe 160' does not overlap with an inner pipe 182", and the lower end (downstream end) of the extending pipe 160' is apart from an upper end (upstream end) of the inner pipe 182". The absence of overlap is helpful to simplify the platinum conduit per se and to facilitate equipment design. Although it is likely that the absence of overlap is determined as a mere design choice, it is not true. It should be taken into consideration that the apparatus for molten glass has a peculiar difficulty.

When glass producing equipment starts flowing therethrough molten glass after being built, the glass producing equipment is continuously operated for an extremely long period of time (about 2 to 15 years). If there is a defect in the glass producing equipment, the glass producing equipment is almost beyond repair and needs to be entirely rebuilt. It is extremely difficult to directly observe a flow of molten glass since the molten glass has a significantly high temperature of 1,200° C. or more. From this point of view, the apparatus for molten glass is preferred to be designed as not only equipment free of a defect but also simple equipment in some cases.

The above-mentioned conduit structure without having overlapping portions has a significantly large contribution in terms of attaining the objects of the present invention without having overlapping portions.

In a case where a flow of molten glass containing a boundary layer flow flows in the extending pipe 160' shown in FIG. 12, when the boundary layer flow, which contains components eluted from a refractory brick, foreign substances etc. generated in the interface with a platinum wall surface, arrives at the lower end (downstream end) of the extending pipe 160', the boundary layer flow moves along directions indicated by arrows B. In other words, the boundary layer flow spreads outside from the lower end (downstream end) of the extending pipe 160' and moves through the gap between the inner wall of the pit body 181 and the outer wall of the inner pipe 182". On the other hand, the main flow moves along directions indicated by arrows A and move through the inner pipe 182". Thus, the boundary layer flow and the main flow are physically separated from each other.

The reason why the boundary layer flow moves along the directions indicated by the arrows B in the embodiment shown in FIG. 12 will be described.

In a position between the lower end (downstream end) of the downfalling pipe 160' and the upper end (upstream end) of the inner pipe 182", a pressure difference is produced between a position close to the circumference (close to the inner wall) of the pit body 181 and a position close to the center of the pit body 181 where the main flow flows. Thus, the position close to the circumference (close to the inner wall) of the pit body 181 is set at a lower pressure than the portion close to the center of the pit body 181. This pressure difference causes the boundary layer flow to move along the directions indicated by the arrows B.

In the embodiment shown in FIG. 12, the main flow, which moves through the inner pipe 182", moves along the directions indicated by the arrows A in this figure and further moves downstream. On the other hand, the boundary layer flow, which moves through the gap space between the inner wall of the pit body 181 and the outer wall of the inner pipe 182", moves along the direction indicated by the arrows B in this figure and is discharged through the drain-out 183. Thus, only the main flow, which has been separated from the boundary layer flow containing components eluted from a refractory brick or bubbles generated in the interface with a platinum wall surface, is supplied to a forming apparatus. On the other hand, the boundary layer flow discharged through the drain-out 183 is discarded.

In the embodiment shown in FIG. 12, it is preferred that the distance d between the lower end (downstream end) of the extending pipe 160' and the upper end (upstream end) of the inner pipe 182", and the outer diameter $D_2$ of the inner pipe 182" satisfy the relationship represented by the following formula (26)

$$0 < d \leq 5 \times D_2 \tag{26}$$

When d and $D_2$ satisfy the above-mentioned formula (26), the distance between the lower end (downstream end) of the extending pipe 160' and the upper end (upstream end) of the inner pipe 182" is set to be enough to physically separate the boundary layer flow and the main flow. More specifically, when d and $D_2$ satisfy the above-mentioned formula (26), the boundary layer flow moves along the directions indicated by the arrows B while the main flow moves along the directions indicated by the arrows A. Thus, a portion of the main flow is unlikely to move along the directions indicated by the arrows B, and a portion of the boundary layer flow, which moves along the direction indicated by the arrows B, is unlikely to rejoin the main flow.

$D_2$ and d more preferably satisfy the following formula (27) and further preferably satisfy the following formula (28).

$$0.5 \times D_2 \leq d \leq 4 \times D_2 \tag{27}$$

$$0.5 \times D_2 \leq d \leq 2 \times D_2 \tag{28}$$

$D_2$ is normally 51 to 912 mm and preferably 102 to 708 mm as described with respect to the embodiment shown in FIG. 10. It is preferred that d be 30 mm or more and 1,000 mm or less, and it is more preferred that d be 50 mm or more and 700 mm or less.

The dimensions of the extending pipe 160' and the inner pipe 182" are the same as described with respect to the embodiment shown in FIG. 10.

Figure 13:
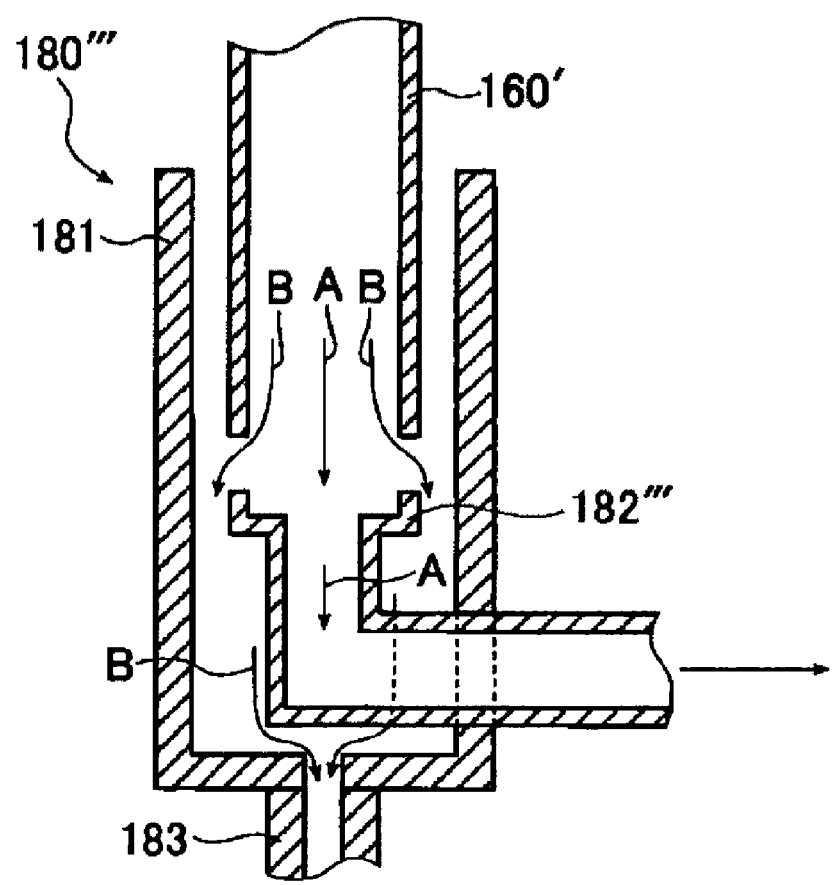
FIG. 13 is a view similar to FIG. 12, wherein the inner pipe has an upper end (upstream end) formed in a different shape from that shown in FIG. 12.

FIG. 13 is an enlarged view showing the downstream pit according to another embodiment of the vacuum-degassing apparatus according to the second mode and its surroundings. It should be noted that an inner pipe 182''' has an upper end (upstream end) formed a different shape from the inner pipe shown in FIG. 12. In FIG. 13, the upper end (upstream end) of the inner pipe 182''' has an enlarged diameter portion. The inner pipe 182''' shown in FIG. 13 is helpful to increase the flow rate of the main flow with the change in equipment design being minimized by having the enlarged diameter portion in the upper end (upstream end).

The enlarged diameter portion may be configured not only to abruptly reduce the diameter as shown in FIG. 13 but also to gradually or stepwise reduce the diameter.

In the embodiments shown in FIGS. 12 and 13, it is preferred that the inner diameter $D_1$ of the extending pipe 160' and the outer diameter $D_2$ of the inner pipe 182" or 182''' satisfy the relationship represented by the following formula (29).

$$0.98 \times D_2 \leq D_1 \leq 2.5 \times D_2 \tag{29}$$

When the upper end (upstream end) of the inner pipe 182''' has such an enlarged diameter portion as shown in FIG. 13, the outer diameter $D_2$ of the inner pipe 182''' means the outer diameter of such an enlarged diameter portion.

When the inner diameter $D_1$ of the extending pipe 160' and the outer diameter $D_2$ of the inner pipe 182" or 182''' satisfy the relationship represented by the above-mentioned formula (29), the boundary layer flow and the main flow are physically separated in an appropriate way since the difference between the inner diameter of the extending pipe 160' and the outer diameter of the inner pipe 182" or 182''' is not significant. When the difference between the inner diameter of the extending pipe 160' and the outer diameter of the inner pipe 182" or 182''' is significant, it is likely that the boundary layer flow is not separated from the main flow in a sufficient manner (this is a case where the inner pipe 182" or 182''' has a large outer diameter). Or, the amount of a portion of the main flow, which is mixed into the boundary layer flow, increases, thus unfavorably reducing the yield of produced glass (this is a case where that the extending pipe 160' has a large inner diameter).

In the vacuum-degassing apparatus according to each of the first and second modes of the present invention, it is preferred that the vacuum-degassing vessel has a flow-control member disposed therein so that the flow of molten glass moving through the vacuum-degassing vessel, more specifically, the surface layer of the flow of molten glass moving through the vacuum degassing vessel is directed toward the side walls of the vacuum-degassing is vessel.

The vacuum-degassing apparatus according to the first mode of the present invention separates the boundary layer flow and the main flow of the molten glass moving through the downfalling pipe or the extending pipe by utilizing a double-pipe structure, which is disposed in the downfalling pipe or the extending pipe connected to the lower end (downstream end) of the downfalling pipe as described above.

The vacuum-degassing apparatus according to the second mode of the present invention separates the boundary layer flow and the main flow of the molten glass moving through the downfalling pipe or the extending pipe by utilizing the overlapping portions (containing a case where there are no overlapping portions), which are formed of the downfalling pipe or the extending pipe connected to the lower end (downstream end) of the downfalling pipe and the inner pipe disposed in the downstream pit.

The boundary layer flow, which contains components eluted from a refractory brick, and foreign substances etc. generated in the interface between the molten glass and a platinum wall surface forming the conduit for molten glass, forms the surface layer of the molten glass moving through the vacuum-degassing vessel as described above.

Accordingly, when the surface layer flow of the molten glass moving through the vacuum-degassing vessel is directed toward the side walls of the vacuum-degassing vessel, the boundary layer flow and the main flow of the molten glass can be more effectively separated from each other in the vacuum-degassing apparatus according to each of the first and second modes of the present invention.

FIG. 14(a) is a cross-sectional view of a vacuum-degassing apparatus as in FIG. 1 and FIG. 7. However, only the vacuum-degassing vessel 120, and the uprising pipe 130 and the downfalling pipe 140 connected to vacuum-degassing vessel 120 are shown. FIG. 14(b) is a plan view of the vacuum-degassing apparatus shown in FIG. 14(a). However, the upper wall surface of the vacuum-degassing vessel 120 is omitted so as to see the inner structure of the vacuum-degassing vessel 120.

As shown in FIG. 14(a), the vacuum-degassing vessel 120 has a flow-control member 122 disposed therein so as to be partly immersed in the surface layer of molten glass G. As shown in FIG. 14(b), the flow control member 122 is formed in a substantially V-character planar shape having a narrow upstream width $W_1$ and a wide downstream width $W_2$ in the flow direction of the molten glass G. As shown in FIG. 14(b), the surface layer flow of the molten glass G moving through the vacuum-degassing vessel 120 is directed toward both side walls of the vacuum-degassing vessel as shown in arrows by disposing the flow-control member 122.

It should be noted that the flow-control member 122 is made of a refractory brick, platinum or a platinum alloy because of being partly immersed in the surface layer of the molten glass.

The following points should be taken into account in order to direct the surface layer flow of the molten glass toward the side walls of the vacuum-degassing vessel by the flow-control member.

It is preferred that the flow-control member 122 be configured to have a thickness in the surface layer of the molten glass and in a horizontal direction orthogonal the flow of the molten glass, i.e. a thickness in its planar shape set to satisfy the following formula (30).

$$W_1 < W_2 \qquad (30)$$

In the above-mentioned formula (30), $W_1$ designates the width (mm) of the flow-control member on the most upstream side, and $W_2$ designates the width of the flow-control member on the most downstream side.

When the above-mentioned formula (30) is satisfied, the surface layer of the molten glass G is directed toward the side walls of the vacuum degassing vessel 120 as shown in the arrows since the width of the flow-control member 122 increases toward downstream in the flow direction of the molten glass G, i.e. the planar shape of the flow-control member 122 spreads toward downstream in the flow direction of the molten glass G.

It is preferred that $W_1$ and $W_2$ satisfy the following formula (31).

$$W_1 < W_2/2 \qquad (31)$$

The flow-control member is not limited to have such a substantially V-character shape as shown in FIG. 14(a) as long as the planar shape of the flow-control member spreads toward downstream in the flow direction of the molten glass G. For example, the flow-control member may be formed in a substantially U-character shape or a substantially fork shape to spread toward downstream in the flow direction of the molten glass G or may be formed in a substantially trapezoidal shape to have a top side and a base side positioned on the upstream side and the downstream side in the flow direction of the molten glass G, respectively. Although the flow-control member shown in FIG. 14(b) is formed of a portion effective to direct the surface layer of the molten glass G toward the side walls of the vacuum degassing vessel 120, i.e. such a V-character shape portion and a hollow portion on the downstream side of the molten glass G, the flow-control member may be formed in a substantially triangular shape with the hollow portion filled therein.

When the molten glass G has an axis extending in the flow direction in the vacuum-degassing vessel 120, the planar shape of the flow-control member 122 is preferred to be substantially axisymmetrical with respect to the axis since the surface layer of the molten glass G is uniformly directed toward both side walls of the vacuum-degassing vessel 120 in FIG. 14(b). In order that the surface layer of the molten glass G is uniformly directed toward both side walls of the vacuum-degassing vessel 120, it is preferred that a portion of the molten glass G flowing in the vicinity of the center in the width direction of the vacuum-degassing vessel 120 has an axis extending in the flow direction, the planar shape of the flow-control member 122 be substantially axisymmetrical with respect to the axis.

It should be noted that the flow-control member may be asymmetrical with respect to an axis unless a problem occurs in directing the surface layer of the molten glass toward the side walls of the vacuum-degassing vessel.

It is preferred that the most downstream side of the flow-control member 122 be disposed at a position closer to the upstream side of the flow direction of the molten glass G than the tube axis of the downfalling pipe 140 (indicated by a dotted line in FIG. 14(a)). When the most downstream side of the flow-control member 122 is disposed at a position closer to the downstream side of the flow direction of the molten glass G than the tube axis of the downfalling pipe 140, it is likely that the surface layer of the molten glass G fails to be directed toward the side walls of the vacuum-degassing vessel 120 before arriving at the downfalling pipe 140.

When the flow-control member is disposed on the upstream side in the vacuum degassing vessel 120, it is possible that a portion of the surface layer of the molten glass G, which is directed toward the side walls of the vacuum degassing vessel 120, returns into the vicinity of the center of the vacuum degassing vessel 120 during moving downstream through the vacuum degassing vessel 120. From this point of view, the flow-control member 122 is preferably disposed on the downstream side of the molten glass G in the vacuum degassing vessel 120 as shown in FIGS. 14(a) and (b).

It is preferred that the maximum value α of the angle included between the flow direction of the molten glass G (indicated by $G_0$ in FIG. 14(b)) and the portion effective to direct the surface layer of the molten glass G toward the side walls of the vacuum degassing vessel 120 in the planar shape of the flow-control member satisfy the following formula (32).

$$15 \text{ degrees} \leq \alpha \leq 85 \text{ degrees} \quad (32)$$

The portion effective to direct the surface layer flow of the molten glass G toward the side walls of the vacuum-degassing vessel means two arms formed in such a substantially V-character shape in the case of the flow-control member 122 shown in FIG. 14(b). When the planar shape of the flow-control member is formed in a substantially U-character shape or a substantially fork shape to spread toward downstream in the flow direction of the molten glass G, the portion effective to direct the surface layer flow of the molten glass toward the side walls of the vacuum-degassing vessel means two arms formed in such a substantially U-character shape or a such a substantially fork shape. Although the angle included between the flow direction $G_0$ of the molten glass G and the portion effective to direct the surface layer of the molten glass G toward the side walls of the vacuum-degassing vessel varies in the latter case, it is sufficient that the maximum angle satisfy the above-mentioned formula (32). When the planar shape of the flow-control member is formed in such a substantially trapezoidal shape, this portion means two arms, which are disposed to be oblique to the flow direction $G_0$ of the molten glass G and connect between the top side and the base side of the substantially trapezoidal shape so as to be effective to direct the surface layer flow of the molten glass toward the side walls of the vacuum degassing vessel, not the top side and the base side, which are disposed to be orthogonal to the flow direction $G_0$ of the molten glass G and are ineffective to direct the surface layer flow of the molten glass toward the side walls of the vacuum-degassing vessel. When the planar shape of the flow-control member is formed in such a substantially triangular shape, this portion means two arms, which are disposed to be oblique to the flow direction $G_0$ of the molten glass G and connect between the apex of the substantially triangular shape located on the upstream side of the flow direction of the molten glass G and the base side of the substantially trapezoidal shape so as to be effective to direct the surface layer flow of the molten glass toward the side walls of the vacuum degassing vessel, not the base side, which is disposed to be orthogonal to the flow direction $G_0$ of the molten glass G and are ineffective to direct the surface layer flow of the molten glass toward the side walls of the vacuum degassing vessel.

When the angle α is less than 15 degrees, it is likely that the function of directing the surface layer of the molten glass G toward the side walls of the vacuum-degassing vessel 120 becomes insufficient. On the other hand, the angle α is beyond 85 degrees, it is likely that the molten glass G is prevented from smoothly flowing since the angle to the flow direction of the molten glass G become excessive.

It is more preferred that the angle α satisfy the following formula (33).

$$30 \text{ degrees} \leq \alpha \leq 80 \text{ degrees} \quad (33)$$

It is preferred that the flow-control member 122 be configured to satisfy the following formulas (34) and (35).

$$20 \text{ mm} \leq X \quad (34)$$

$$50 \text{ mm} \leq h \quad (35)$$

In formula (34), X designates a depth, by which the flow-control member 122 is immersed in the surface layer of the molten glass G. In formula (35), h designates the height between the bottom of the vacuum-degassing vessel 120 and the bottom of the flow-control member 122.

When X is less than 20 mm, it is likely that the function of directing the surface layer toward the side walls of the vacuum-degassing vessel 120 becomes insufficient since a portion of the surface layer of the molten glass G moves in under the flow-control member 122.

When h is less than 50 mm, it is likely that the function of directing the surface layer toward the side walls of the vacuum-degassing vessel 120 becomes insufficient since the distance between the bottom of the vacuum-degassing vessel 120 and the bottom of the flow-control member 122 excessively decreases to increase the flow rate of the molten glass G passing through both bottoms and capture the surface layer of the molten glass G in both bottoms.

X is more preferably 30 mm or more, most preferably 40 mm or more, and h is more preferably 60 mm or more, most preferably 70 mm or more.

It is preferred that two gaps $Y_1$ and $Y_2$ (mm) extending between the side walls of the vacuum degassing vessel 120 and the most downstream portion of the flow-control member 122 in the surface layer of the molten glass G in a direction orthogonal to the flow direction of the molten glass G satisfy the following formulas (36) and (37).

$$Z \leq Y_1 \leq \phi/4 \quad (36)$$

$$Z \leq Y_2 \leq \phi/4 \quad (37)$$

In formulas (36) and (37), φ designates the inner diameter of the vacuum-degassing vessel 120 extending in the surface layer of the molten glass G in a horizontal direction orthogonal to the flow of molten glass G, and Z designates φ/30 or X/2, whichever smaller.

When $Y_1$ and $Y_2$ is more than φ/4, it is likely that the function of directing the surface layer of the molten glass G toward the side walls of the vacuum-degassing vessel 120 becomes insufficient since the gaps become excessively great. On the other hand, when $Y_1$ and $Y_2$ are smaller than φ/30, it is likely that the molten glass G is prevented from smoothly flowing since the gaps are excessively narrow. On the other hand, when $Y_1$ and $Y_2$ are smaller than X/2, it is likely that the function of directing the surface layer toward the side walls of the vacuum-degassing vessel 120 becomes insufficient since the depth of the portion of the flow-control member 122 immersed in the molten glass G is made smaller than the gaps with the side walls of the vacuum-degassing vessel 120, allowing a portion of the surface layer of the molten glass G to move in under the flow-control member 122.

Although the flow-control member has been explained, referring to some figures, with respect to an embodiment to directing the surface layer of the molten glass G is toward both side walls of the vacuum-degassing vessel, the flow-control member is not limited to have the shown embodiment as long as at least a portion of the flow-control member is disposed in the vacuum-degassing vessel so as to be immersed in the surface layer of the molten glass and so as to direct the surface layer flow of the molten glass toward a side wall of the vacuum-degassing vessel. From this point of view, the flow-control member may be configured to direct the surface layer of the molten glass G toward a single side wall of the vacuum-degassing vessel.

Figure 15:
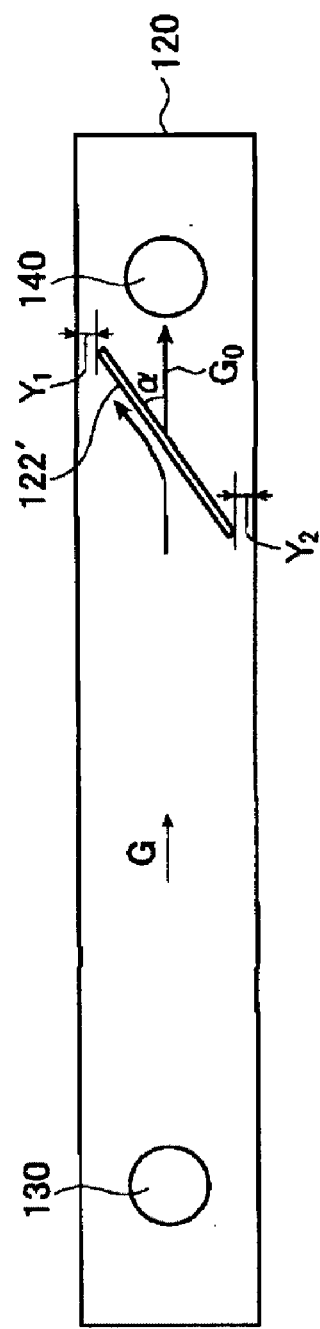
FIG. 15 is a view similar to FIG. 14(b), wherein a flow-control member is formed in a different shape from that shown in FIG. 14(b).

FIG. 15 is a plan view of the vacuum-degassing vessel as in FIG. 14(b). In FIG. 15, a flow-control member 122' is linearly disposed so as to be oblique to the flow direction $G_0$ of the molten glass G so that the surface layer of the molten glass G moving through the vacuum-degassing vessel 120 is directed toward a single side wall of the vacuum-degassing vessel 120.

The above-mentioned formulas (32) to (37) are also applied to the embodiment shown in FIG. 15. In the embodiment shown in FIG. 15, it is sufficient that there is a single gap $Y_1$ between the flow-control member and a side wall of the vacuum-degassing vessel to that the surface layer of the molten glass G is directed, and it is not necessary that there is a gap $Y_2$ between the flow-control member and the side wall of the vacuum-degassing vessel to that the surface layer of the molten glass G is not directed. In this case, only formula (36) of formulas (36) and (37) is applied.

In the method for vacuum-degassing molten glass according to the present invention, molten glass supplied from a melting vessel may pass through a vacuum degassing vessel depressurized to a certain degree of depression to be vacuum-degassed by use of a vacuum degassing apparatus, wherein the conduit structure according to the present invention is utilized in an extending pipe connected to a downfalling pipe formed of fused cast refractories or a downfalling pipe made of platinum or a platinum alloy, i.e. the vacuum degassing apparatus according to the first mode of the present invention.

In the method for vacuum-degassing molten glass according to the present invention, molten glass supplied from a melting vessel may also pass through a vacuum degassing vessel depressurized to a certain degree of depression to be vacuum-degassed by use of the vacuum degassing apparatus according to the second mode of the present invention.

In the method for vacuum-degassing molten glass according to the present invention, it is possible to supply a forming apparatus with molten glass, from which components eluted from a refractory brick, or foreign substances etc. generated in the interface between molten glass and a platinum wall surface forming a conduit for the molten glass are separated and removed. Thus, it is possible to produce quality glass products with defects minimized.

In the method for vacuum-degassing molten glass according to the present invention, it is preferred that molten glass be continuously supplied to and continuously discharged from the vacuum degassing vessel.

In order that the vacuum-degassing vessel is prevented from being at a different temperature from the molten glass supplied from a melting vessel, it is preferred that the vacuum-degassing vessel be heated to be at a temperature ranging from 1,100 to 1,500° C., in particular 1,150 to 1,450° C. therein. The flow rate of molten glass is preferably 1 to 1,000 ton/day in terms of productivity.

The flow rate of molten glass is the sum of the flow rate of the main flow and the flow rate of the drain-out. It is preferred that the flow rate of the main flow be at least one time, in particular at least two times, further at least five times the flow rate of the drain-out. When the flow rate of the main flow is too small, the productivity lowers. When the flow rate of the main flow is too large, it is likely that the main flow and the boundary layer flow are separated from each other in an insufficient manner.

When performing the method for vacuum-degassing molten glass, the inside of the vacuum-degassing vessel disposed in the vacuum housing is kept in a certain depressurized state by evacuating the vacuum housing by an external vacuum pump or the like. The inside of the vacuum-degassing vessel is preferably depressurized to 51 to 613 hPa (38 to 460 mmHg), more preferably 80 to 338 hPa (60 to 253 mmHg).

There is no limitation to the glass degassed by the present invention in terms of composition as long as the glass can be heated and melted to be produced. From this point of view, the molten glass may be soda-lime-silica based glass represented by soda-lime glass, or alkali glass, such as alkali-borosilicate glass.

The dimensions of the respective members of the vacuum-degassing apparatus may be properly chosen according to use requirements. In the case of the vacuum-degassing vessel 120 shown in each of FIGS. 1 and 7, the dimensions of specific examples are listed below.

Length in horizontal direction: 1 to 20 m
Internal width in cross-sectional shape: 0.2 to 5 m The dimensions of specific examples of the uprising pipe 130 and the downfalling pipe 140 are listed below.

Length: 0.2 to 6 m, preferably 0.4 to 4 m
Internal width in cross-sectional shape: 0.05 to 0.8 m, preferably 0.1 to 0.6 m The dimensions of the extending pipe 150 connected to the uprising pipe 130 may be the same as those described with respect to the outer pipe of the conduit structure according to the present invention.

INDUSTRIAL APPLICABILITY

The conduit structure for molten glass according to the present invention may be utilized in the downfalling pipe of a vacuum-degassing apparatus, or in an extending pipe connected to the downfalling pipe, and is suited to a vacuum-degassing apparatus for molten glass, which effectively removes foreign substances etc. from molten glass.

The entire disclosure of Japanese Patent Application No. 2006-231831 filed on Aug. 29, 2006 including specification, claims, drawings and summary is incorporated herein by reference in its entirety.

What is claimed is:

1. A conduit structure for molten glass, which is formed of a hollow pipe made of platinum or a platinum alloy, the conduit structure comprising:
   a double-pipe structure disposed in at least a downstream portion of the conduit structure, the double-pipe structure being formed of an inner pipe disposed within an outer pipe;
   the inner pipe having an upstream end and a downstream end formed as open ends;
   the outer pipe having a downstream end formed as a closed end in a region located in a gap between the inner pipe and the outer pipe and as an open end in a region located in the inner pipe in the double-pipe structure;
   the conduit structure having an upstream end formed as an open end; and
   the outer pipe having an opening formed in a portion close to the downstream end thereof,
   wherein a distance $L_{in}$ (mm) between the upstream end of the inner pipe and an upstream end of the opening in the outer pipe, and an inner diameter $D_{in}$ (mm) of the inner pipe satisfy a relationship represented by formula:

$$L_{in} \geqq D_{in}/2.$$

2. The conduit structure for molten glass according to claim 1, wherein a difference $D_{out-in}$ (mm) between an inner diameter of the outer pipe and an outer diameter of the inner pipe, and an inner diameter $D_{in}$ (mm) of the inner pipe satisfy a relationship represented by formula:

$$D_{out-in} \geqq 0.02 \times D_{in}.$$

3. The conduit structure for molten glass according to claim 1, wherein a distance $L_{in}$ (mm) between the upstream end of the inner pipe and an upstream end of the opening, and a difference $D_{out-in}$ (mm) between an inner diameter of the outer pipe and an outer diameter of the inner pipe satisfy a relationship represented by formula:

$$L_{in} \geqq (D_{out-in}/2) \times 3.$$

4. The conduit structure for molten glass according to claim 1, wherein a difference $S_{out-in}$ (mm$^2$) in section obtained by subtracting a sectional area of a channel formed by the inner pipe from a sectional area of a channel formed by the outer pipe, and a sectional area $S_{in}$ (mm$^2$) of the channel formed by the inner pipe satisfy the relationship represented by formula:

$$S_{out-in} \leq S_{in}.$$

5. The conduit structure for molten glass according to claim 1, wherein an area S (mm$^2$) of the opening and an inner diameter $D_{out}$ (mm) of the outer pipe satisfy the relationship represented by formula:

$$S \geq 9 \times D_{out}.$$

6. The conduit structure for molten glass according to claim 1, which is utilized as a downfalling pipe of a vacuum degassing vessel including an uprising pipe, a vacuum degassing vessel and the downfalling pipe.

7. The conduit structure for molten glass according to claim 1, wherein the conduit structure is utilized as an extending pipe which is connected to a downfalling pipe of a vacuum degassing vessel that also includes an uprising pipe.

8. A vacuum degassing apparatus comprising:
a vacuum degassing vessel having an uprising pipe and a downfalling pipe;
a conduit structure formed of a hollow pipe made of platinum or a platinum alloy and configured to flow molten glass from the downfalling pipe, the conduit structure comprising:
a double-pipe structure disposed in at least the downstream portion of the conduit structure, the double-pipe structure being formed of an inner pipe disposed within an outer pipe;
the inner pipe having an upstream end and a downstream end formed as open ends;
the outer pipe having a downstream end formed as a closed end in a region located in a gap between the inner pipe and the outer pipe and as an open end in a region located in the inner pipe in the double-pipe structure;
the conduit structure having an upstream end formed as an open end; and the outer pipe having an opening formed in a portion close to the downstream end thereof; and
a downstream pit provided at a downstream portion of the conduit structure such that the downstream pit receives the molten glass from the conduit structure, the downstream pit comprising a drain out positioned to receive molten glass from the opening formed in the outer pipe.

9. The vacuum degassing apparatus according to claim 8, wherein the inner pipe projects from the closed end of the outer pipe in the downstream portion of the conduit structure.

10. The vacuum degassing apparatus of claim 8, wherein the conduit structure is coupled to the downfalling pipe.

11. A method for vacuum-degassing molten glass by use of the vacuum degassing apparatus defined in claim 10.

12. The vacuum degassing apparatus of claim 8, wherein the conduit structure is coupled to an extending pipe connected to the downfalling pipe.

13. The vacuum degassing apparatus according to claim 8, wherein the double-pipe structure for molten glass satisfies the following formula in at least the upstream end thereof:

$$W_{downstream} > W_{upstream}$$

(where $W_{downstream}$ is a width (mm) of a gap between the outer pipe and the inner pipe in a horizontal direction on a downstream side of a flow of molten glass, and $W_{upstream}$ is a width (mm) of a gap between the outer pipe and the inner pipe in the horizontal direction on the upstream side of the flow of molten glass).

14. The vacuum degassing apparatus according to claim 13, wherein $W_{downstream}$ and $W_{upstream}$ satisfy formula:

$$W_{downstream} \geq 2 \times W_{upstream}.$$

15. The vacuum degassing apparatus according to claim 8, further comprising a flow-control member, which is disposed in the vacuum degassing vessel so as to have at lease one portion immersed in a surface layer of molten glass, and which directs a flow of the surface layer of the molten glass toward a side wall of the vacuum degassing vessel.

16. The vacuum degassing apparatus according to claim 15, wherein the flow-control member has a width set to satisfy the following formula in the surface layer of the molten glass and in a horizontal direction orthogonal to a flow of the molten glass:

$$W_1 < W_2$$

(where $W_1$ is a width (mm) of the flow-control member on a most upstream side of the flow-control member, and $W_2$ is a width (mm) of the flow-control member on a most downstream side of the flow-control member).

17. The vacuum degassing apparatus according to claim 15, wherein when the molten glass has an axis extending in a flow direction, a planar shape of the flow-control member is substantially axisymmetrical with respect to the axis.

18. The vacuum degassing apparatus according to claim 15, wherein the flow-control member has a most downstream end located at a position upstream a tube axis of the downfalling pipe in a flow direction of the molten glass.

19. The vacuum degassing apparatus according to claim 15, wherein a maximum value α of an angle included between a flow direction of the molten glass and a portion effective to direct the surface layer of the molten glass toward the side wall of the vacuum degassing vessel in a planar shape of the flow-control member satisfies formula:

$$15 \text{ degrees} \leq \alpha \leq 85 \text{ degrees}.$$

20. The vacuum degassing apparatus according to claim 15, wherein the flow-control member satisfies formulas:

$$20 \text{ mm} \leq X$$

$$50 \text{ mm} \leq h$$

(where X is a depth of the flow-control member, by which the flow-control member is immersed in the surface layer of the molten glass, and h is a distance between a bottom of the vacuum degassing vessel and a bottom of the flow-control member).

21. The vacuum degassing apparatus according to claim 15, wherein two gaps $Y_1$ and $Y_2$ (mm) extending between side walls of the vacuum degassing vessel and a most downstream portion of the flow-control member in the surface layer of the molten glass in a direction orthogonal to a flow direction of the molten glass satisfy formulas:

$$Z \leq Y_1 \leq \phi/4$$

$$Z \leq Y_2 \leq \phi/4$$

(where φ is an inner diameter of the vacuum degassing vessel in the surface layer of the molten glass and in a horizontal direction orthogonal to a flow of the molten glass, and Z is φ/30 or X/2, whichever is smaller, wherein X is a depth, by which the flow-control member is immersed in the surface layer of the molten glass).

22. The vacuum degassing apparatus of claim 8, wherein the opening formed in the outer pipe has an upstream end located a distance of 0-500 mm downstream from an upstream end of the drain out.

* * * * *